United States Patent
Namgoong et al.

(10) Patent No.: US 10,447,447 B2
(45) Date of Patent: Oct. 15, 2019

(54) METHODS AND APPARATUS FOR MULTIPLEXING REFERENCE SIGNALS FOR MULTIPLE INPUT MULTIPLE OUTPUT (MIMO) LAYERS

(71) Applicant: QUALCOMM Incorporated, San Diego, CA (US)

(72) Inventors: June Namgoong, San Diego, CA (US); Tao Luo, San Diego, CA (US); Alexandros Manolakos, San Diego, CA (US); Jing Jiang, San Diego, CA (US); Yang Yang, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 15/475,541

(22) Filed: Mar. 31, 2017

(65) Prior Publication Data
US 2017/0288837 A1    Oct. 5, 2017

Related U.S. Application Data

(60) Provisional application No. 62/318,690, filed on Apr. 5, 2016.

(51) Int. Cl.
*H04L 5/00* (2006.01)
*H04B 7/0413* (2017.01)
(Continued)

(52) U.S. Cl.
CPC .......... *H04L 5/0051* (2013.01); *H04L 5/0007* (2013.01); *H04B 7/00* (2013.01);
(Continued)

(58) Field of Classification Search
CPC .... H04L 5/0051; H04L 5/0007; H04B 7/0413
See application file for complete search history.

(56) References Cited

U.S. PATENT DOCUMENTS 9,179,464 B2    11/2015   Noh et al.
9,258,160 B2     2/2016   Luo et al.
(Continued)

FOREIGN PATENT DOCUMENTS

WO    2016127309 A1    8/2016

OTHER PUBLICATIONS

International Search Report and Written Opinion—PCT/US2017/025641—ISA/EPO—Jun. 23, 2017.

*Primary Examiner* — Jamal Javaid
*Assistant Examiner* — Thad N Defauw
(74) *Attorney, Agent, or Firm* — Linda G. Gunderson; Patterson & Sheridan LLP

(57) ABSTRACT

Methods and apparatus for multiplexing reference signals for Multiple Input Multiple Output (MIMO) layers are provided. Resources for Demodulation Reference Signals (DMRS) corresponding to each of two or more data streams are assigned, wherein the resources assigned to each of the data streams are staggered in frequency and span two or more OFDM (Orthogonal Frequency Divisional Multiplexing) symbols. The DMRS is transmitted using the assigned resources.

14 Claims, 23 Drawing Sheets

(51) Int. Cl.
 *H04L 27/26* (2006.01)
 *H04B 7/00* (2006.01)
(52) U.S. Cl.
 CPC .......... *H04B 7/0413* (2013.01); *H04L 5/0016* (2013.01); *H04L 5/0023* (2013.01); *H04L 27/26* (2013.01)

(56) References Cited

U.S. PATENT DOCUMENTS

| | | | |
|---|---|---|---|
| 2009/0197546 A1* | 8/2009 | Kim ..................... | H04B 7/0671 455/101 |
| 2010/0067512 A1 | 3/2010 | Nam et al. | |
| 2010/0080154 A1* | 4/2010 | Noh ..................... | H04B 7/0452 370/310 |
| 2013/0195034 A1* | 8/2013 | Noh ..................... | H04L 5/0053 370/329 |
| 2013/0343477 A9* | 12/2013 | Jia ........................ | H04J 11/00 375/295 |
| 2014/0133395 A1 | 5/2014 | Nam et al. | |
| 2014/0301346 A1 | 10/2014 | Seo et al. | |

\* cited by examiner

METHODS AND APPARATUS FOR MULTIPLEXING REFERENCE SIGNALS FOR MULTIPLE INPUT MULTIPLE OUTPUT (MIMO) LAYERS

This application claims priority to U. S. Provisional Application Ser. No. 62/318,690, entitled "METHODS AND APPARATUS FOR MULTIPLEXING REFERENCE SIGNALS FOR MULTIPLE INPUT MULTIPLE OUTPUT (MIMO) LAYERS", filed on Apr. 5, 2016, which is expressly incorporated by reference in its entirety.

FIELD

The present disclosure relates generally to wireless communication, and more particularly, to methods and apparatus for multiplexing reference signals for multiple Multiple Input Multiple Output (MIMO) layers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communication. The method generally includes assigning resources for Demodulation Reference signals (DMRS) corresponding to each of two or more data streams, wherein resources assigned to each of the data streams are staggered in frequency and span two or more Orthogonal Frequency Division Multiplexing (OFDM) symbols, and transmit the DMRS using the assigned resources.

Certain aspects of the present disclosure provide an apparatus for wireless communication. The apparatus generally includes means for assigning resources for Demodulation Reference signals (DMRS) corresponding to each of two or more data streams, wherein the resources assigned to each of the data streams are staggered in frequency and span two or more Orthogonal Frequency Division Multiplexing (OFDM) symbols, and means for transmitting the DMRS using the assigned resources.

Certain aspects of the present disclosure provide an apparatus for wireless communication. The apparatus generally includes at least one processor and a memory coupled to the at least one processor. The at least one processor is generally configured to assign resources for Demodulation Reference signals (DMRS) corresponding to each of two or more data streams, wherein the resources assigned to each of the data streams are staggered in frequency and span two or more Orthogonal Frequency Division Multiplexing (OFDM) symbols, and transmit the DMRS using the assigned resources.

Certain aspects of the present disclosure provide a computer-readable medium storing instructions which when executed by at least one processor performs a method including assigning resources for Demodulation Reference signals (DMRS) corresponding to each of two or more data streams, wherein resources assigned to each of the data streams are staggered in frequency and span two or more Orthogonal Frequency Division Multiplexing (OFDM) symbols, and transmit the DMRS using the assigned resources.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

DETAILED DESCRIPTION

Figure 1:
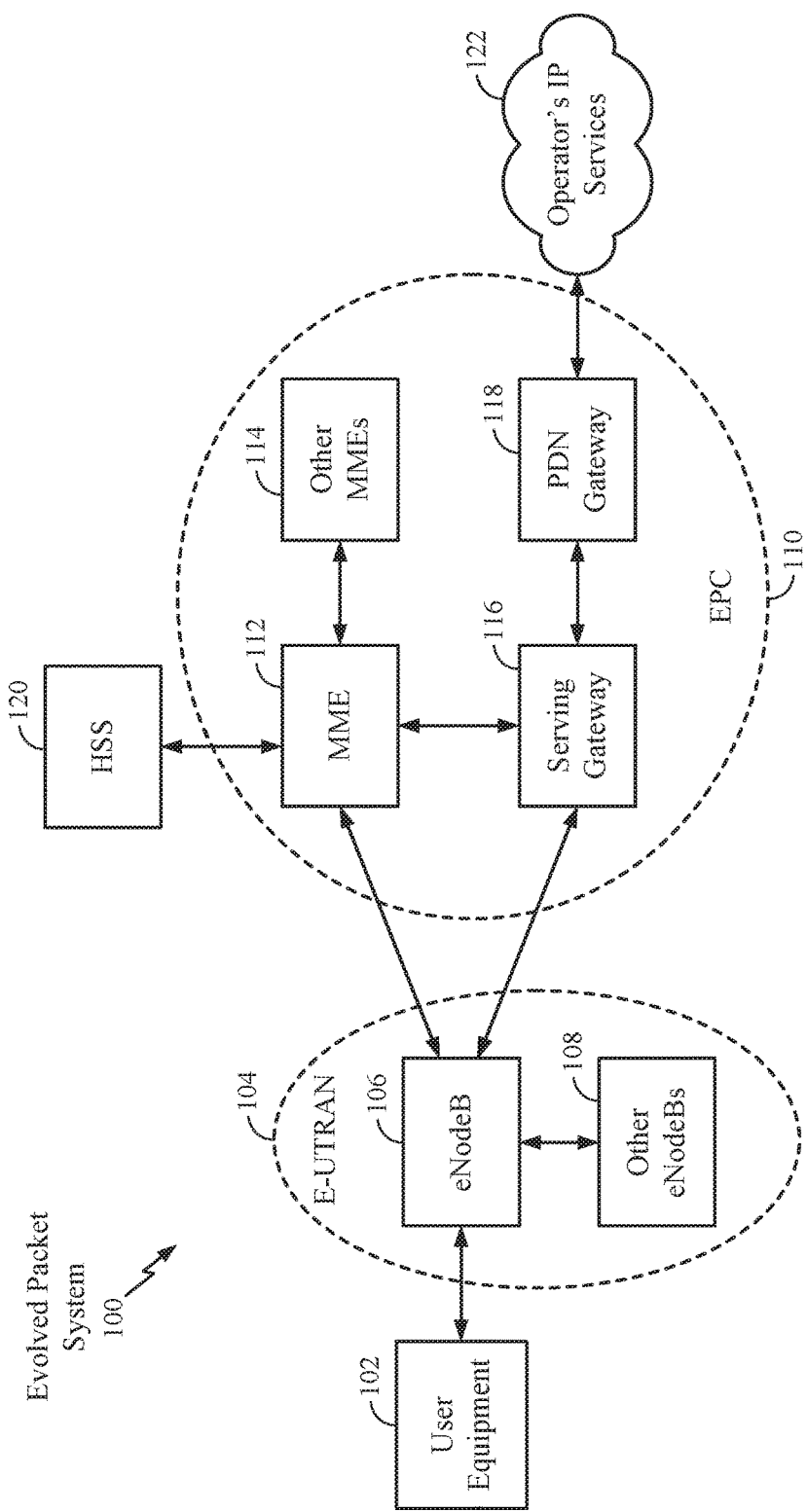
FIG. 1 is a diagram illustrating an example of a network architecture.

Demodulation Reference signal (DMRS) is on-demand UE-specific pilot intended for one UE. Generally the eNB transmits DMRS for each of the MIMO data streams (or layers). Generally, when transmitting multiple DMRS for multiple MIMO layers, the DMRS for the multiple layers is multiplexed over one or more OFDM symbols in an RB. DMRS for each layer is assigned to one of multiple multiplexing groups, each group including multiplexed DMRS for two or more layers. The multiplexing groups are generally separated by frequency division multiplexing (FDM). So, each multiplexing group generally has several multiplexed DMRS corresponding to different MIMO layers being transmitted together simultaneously.

Certain aspects of the present disclosure discuss techniques for multiplexing DMRS corresponding to multiple MIMO layers that achieve at least one of improving channel estimation, randomizing interference, supporting channels with high Doppler, supporting channels with large delay spread, or improving power imbalance.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

For example, a base station (BS) (e.g., eNB 106) assigns resources for Demodulation Reference signals (DMRS) corresponding to each of two or more data streams, wherein resources assigned to each of the data streams are staggered in frequency and span two or more Orthogonal Frequency Division Multiplexing (OFDM) symbols. The BS transmits the DMRS using the assigned resources.

A first core network (CN) (e.g., EPC 110) associated with a first RAT (e.g., 4G or 5G), for example, receives first data from a first BS (e.g., eNB 106) associated with the first RAT, the first data received at the first BS from a UE (e.g., UE 102). The CN receives second data from a second CN (not shown) associated with a second RAT, the second RAT received at a second BS from the UE and communicated to the second CN by the second BS. The CN then aggregates the first and the second data.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
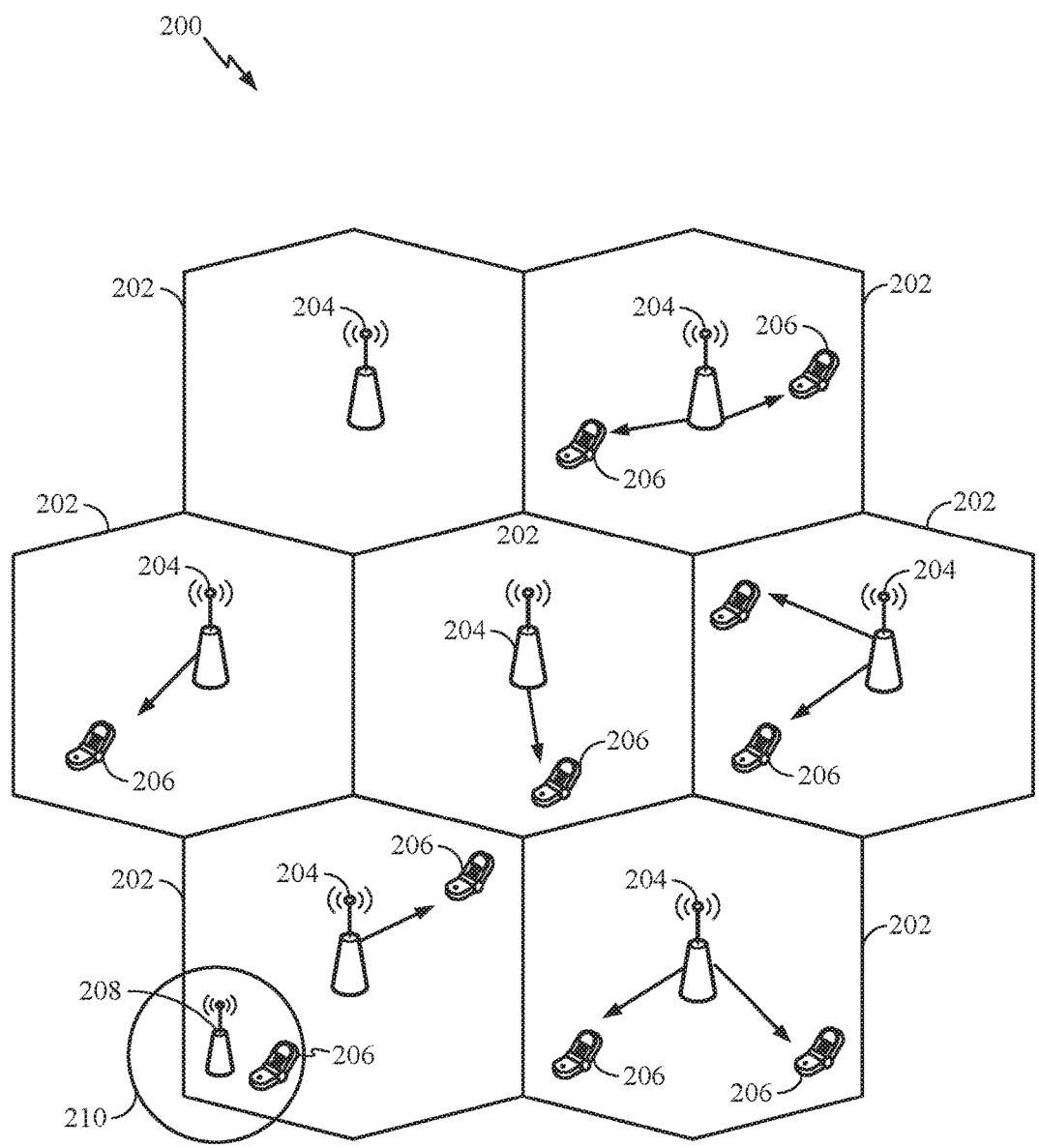
FIG. 2 is a diagram illustrating an example of an access network.

FIG. 2 is a diagram illustrating an example of an access network 200 in an LTE network architecture in which aspects of the present disclosure may be practiced. For example, eNBs 204 and 208 may be configured to implement techniques for multiplexing DMRS corresponding to multiple MIMO layers or data streams, in accordance with aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
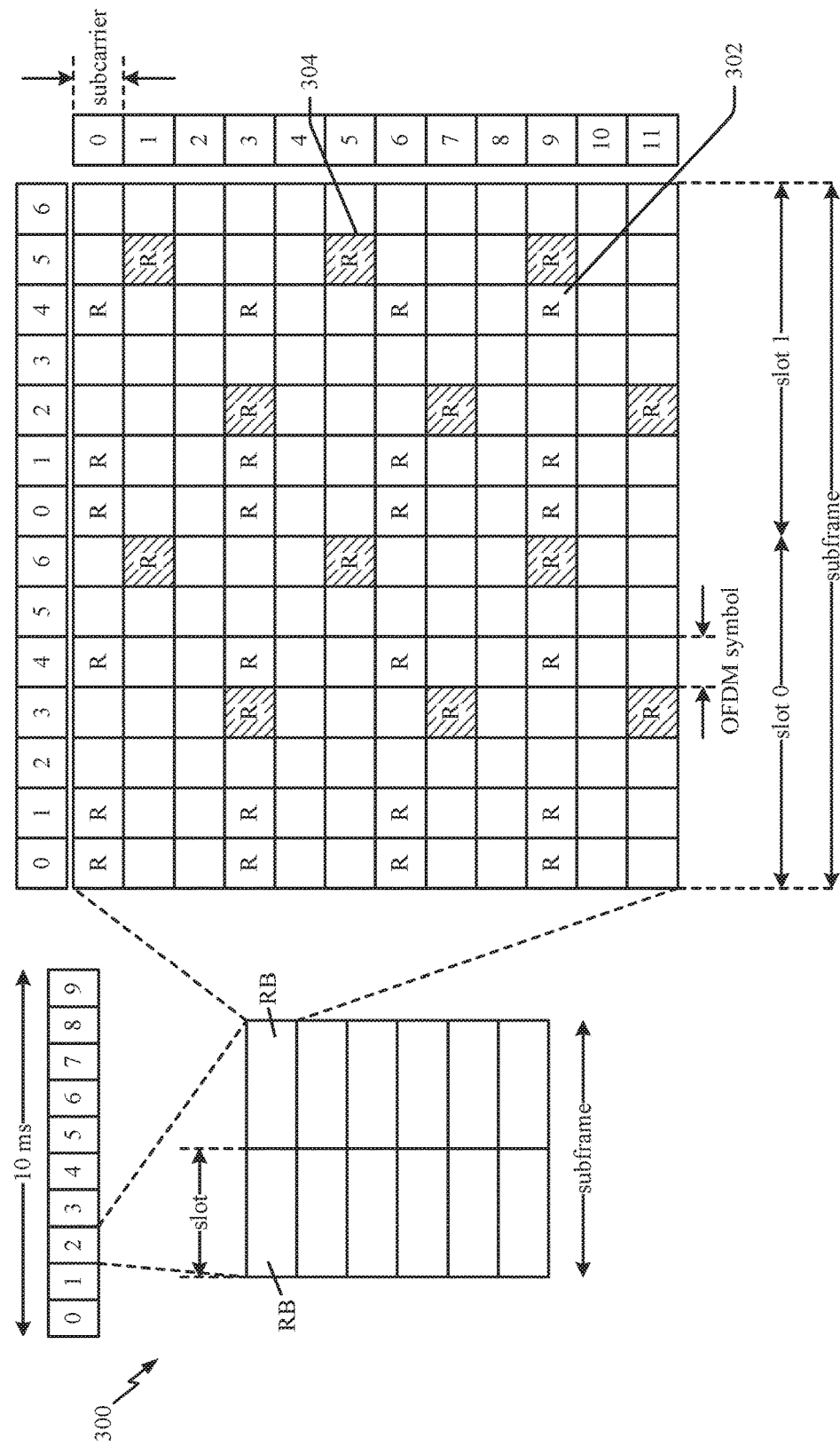
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
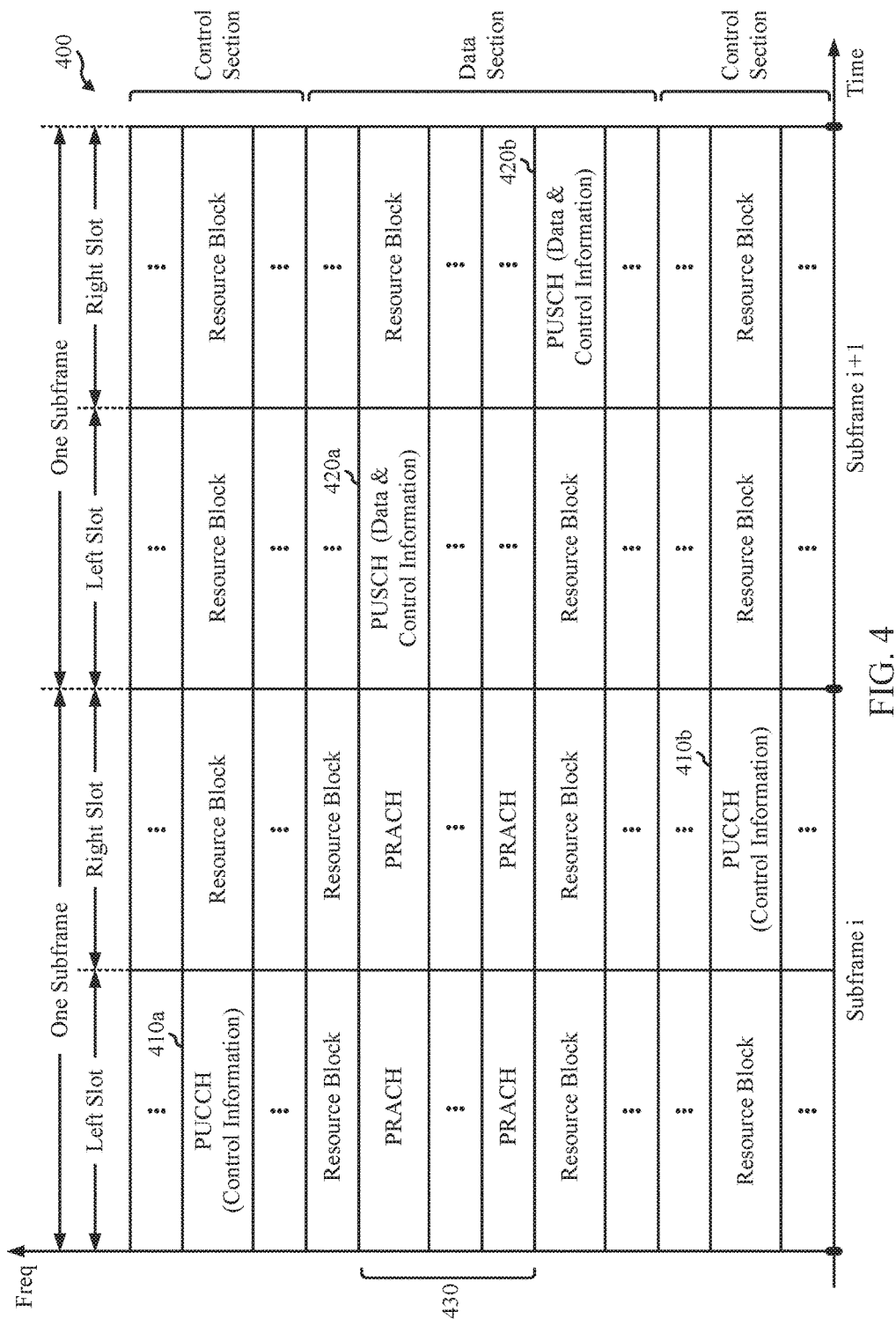
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
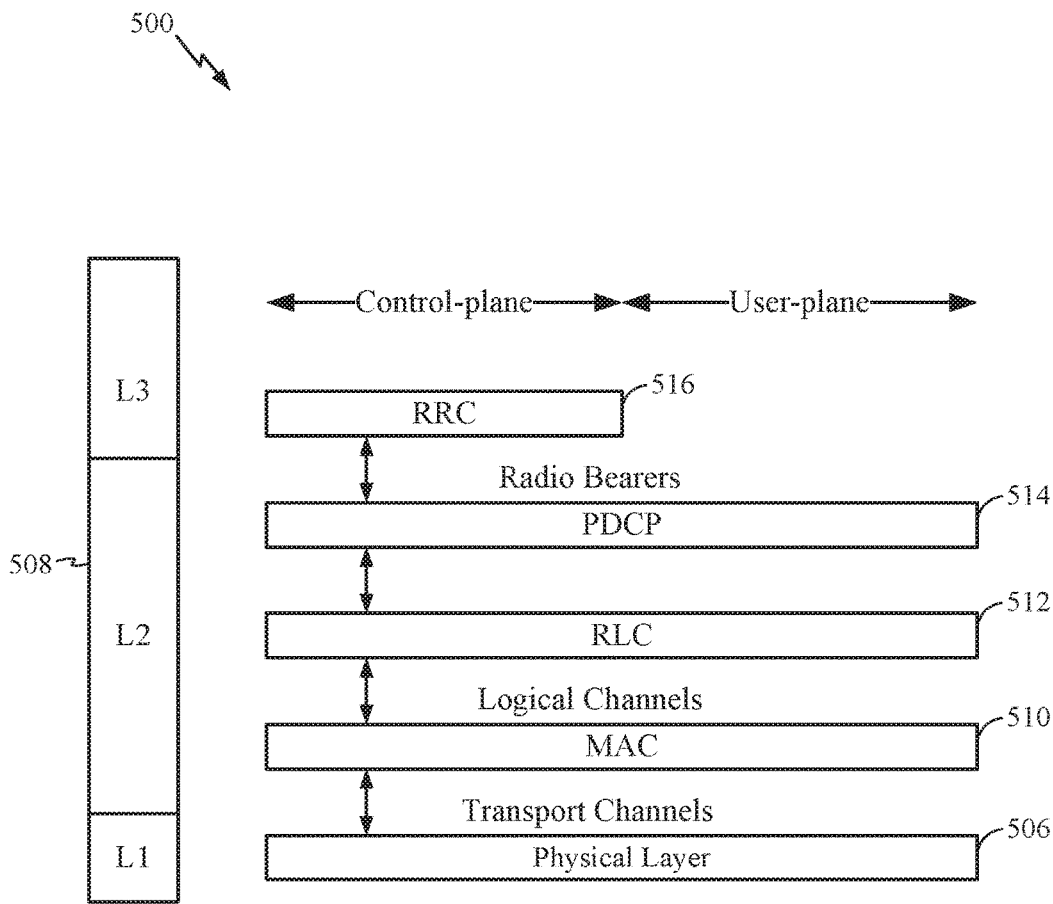
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
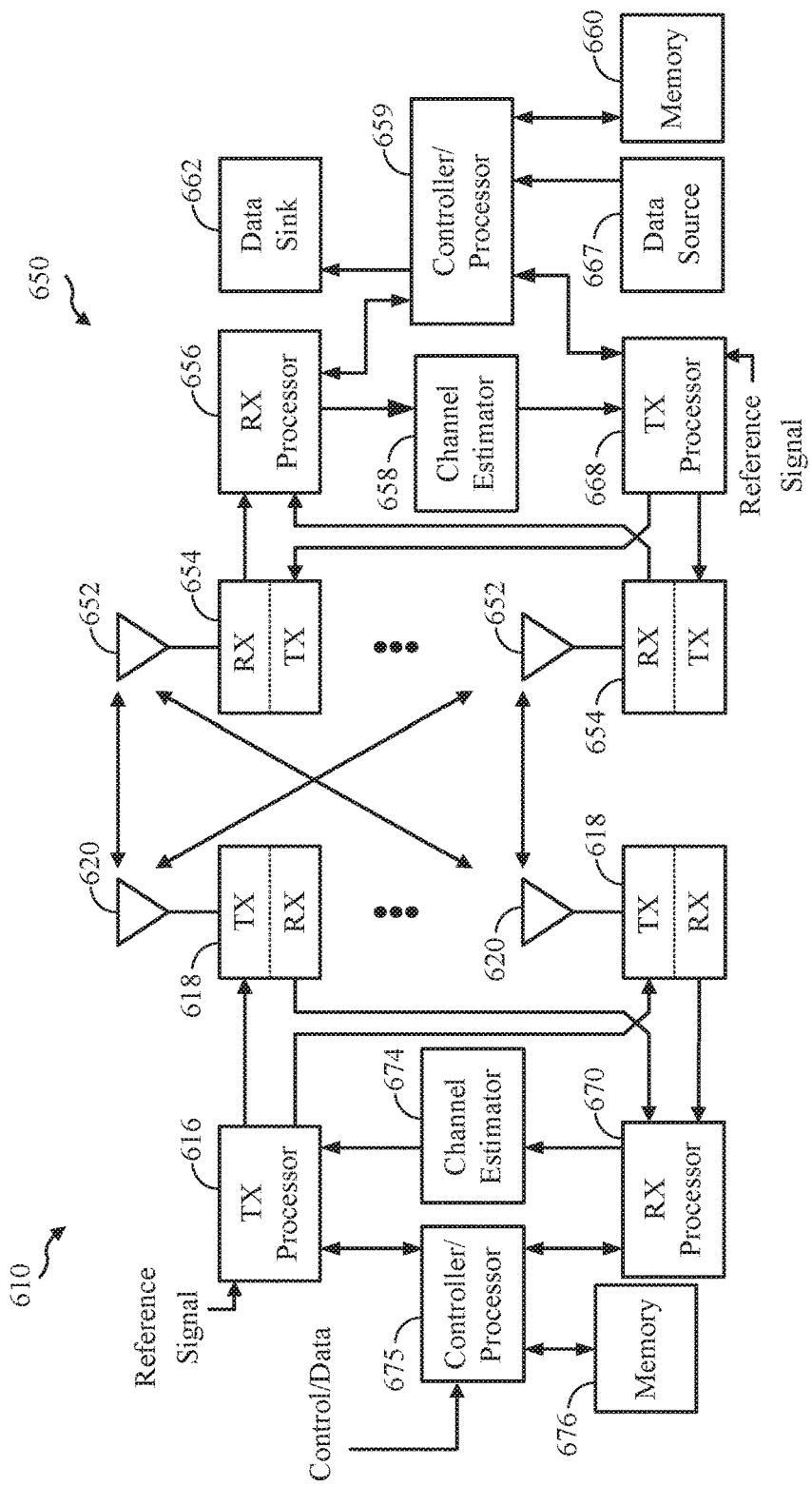
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

For example, a base station (BS) (e.g., eNB 610) assigns resources for Demodulation Reference signals (DMRS) corresponding to each of two or more data streams, wherein resources assigned to each of the data streams are staggered in frequency and span two or more Orthogonal Frequency Division Multiplexing (OFDM) symbols. The BS transmits the DMRS using the assigned resources.

A UE (e.g., UE 650), for example, detects, while connected to a first BS (e.g., eNB 610) associated with a first RAT (e.g., 4G or 5G), availability of a second BS (not shown) associated with a second RAT (e.g., 4G or 5G). The UE determines a type of aggregation to be used for aggregating data to be transmitted to the first and second BSs. The UE then determines how to route (e.g, transmit) data to the first and second BSs based on the determined type of aggregation.

In the DL, upper layer packets from the core network are provided to a controller/processor 675. The controller/processor 675 implements the functionality of the L2 layer, for example. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer), for example. The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer, for example. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer, for example. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659, for example. The data source 667 represents all protocol layers above the L2 layer, for example. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610, for example. The controller/processor 659 is also responsible for HARQ operations, retransmission of lost packets, and signaling to the eNB 610, for example.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer, for example.

The controller/processor 675 implements the L2 layer, for example. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 10:
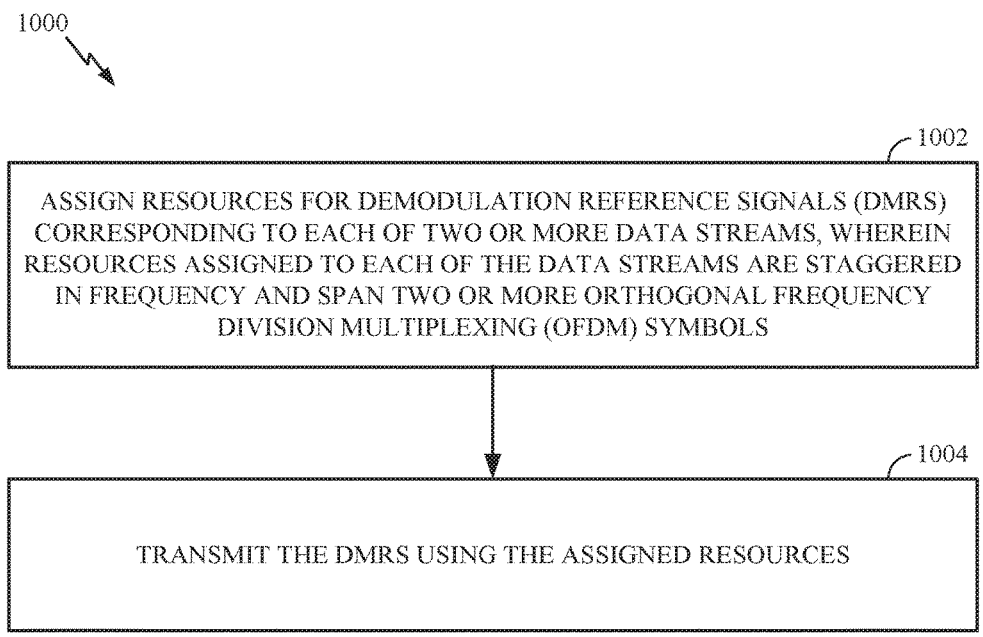
FIG. 10 illustrates example operations 1000 that may be performed by an eNB (e.g., eNB 610 shown in FIG. 6) for assigning DMRS resources, in accordance with certain aspects of the present disclosure.

The controller/processor 675 and/or other processors, components and/or modules at the eNB 610 may perform or direct operations, for example operations 1000 in FIG. 10, and/or other processes or techniques described herein for multiplexing DMRS corresponding to multiple MIMO layers. In certain aspects, one or more of any of the components shown in FIG. 6 may be employed to perform example operations 1000, and/or other processes for the techniques described herein. The memories 660 and 676 may store data and program codes for the UE 650 and eNB 610 respectively, accessible and executable by one or more other components of the UE 650 and the eNB 610.

Example Techniques for Multiplexing Reference Signals for Multiple MIMO Layers

Demodulation Reference signal (DMRS) is on-demand UE-specific pilot intended for one UE. Generally the eNB transmits DMRS for each of the MIMO data streams (or layers). Generally, when transmitting multiple DMRS for multiple MIMO layers, the DMRS for the multiple layers is multiplexed over one or more OFDM symbols in a resource block (RB). DMRS for each layer is assigned to one of multiple multiplexing groups, each group including DMRS for one layer or multiplexed DMRS for multiple layers. The multiplexing groups are generally separated by frequency division multiplexing (FDM). Each multiplexing group generally has several multiplexed DMRS corresponding to different MIMO layers being transmitted together simultaneously.

Figure 7:
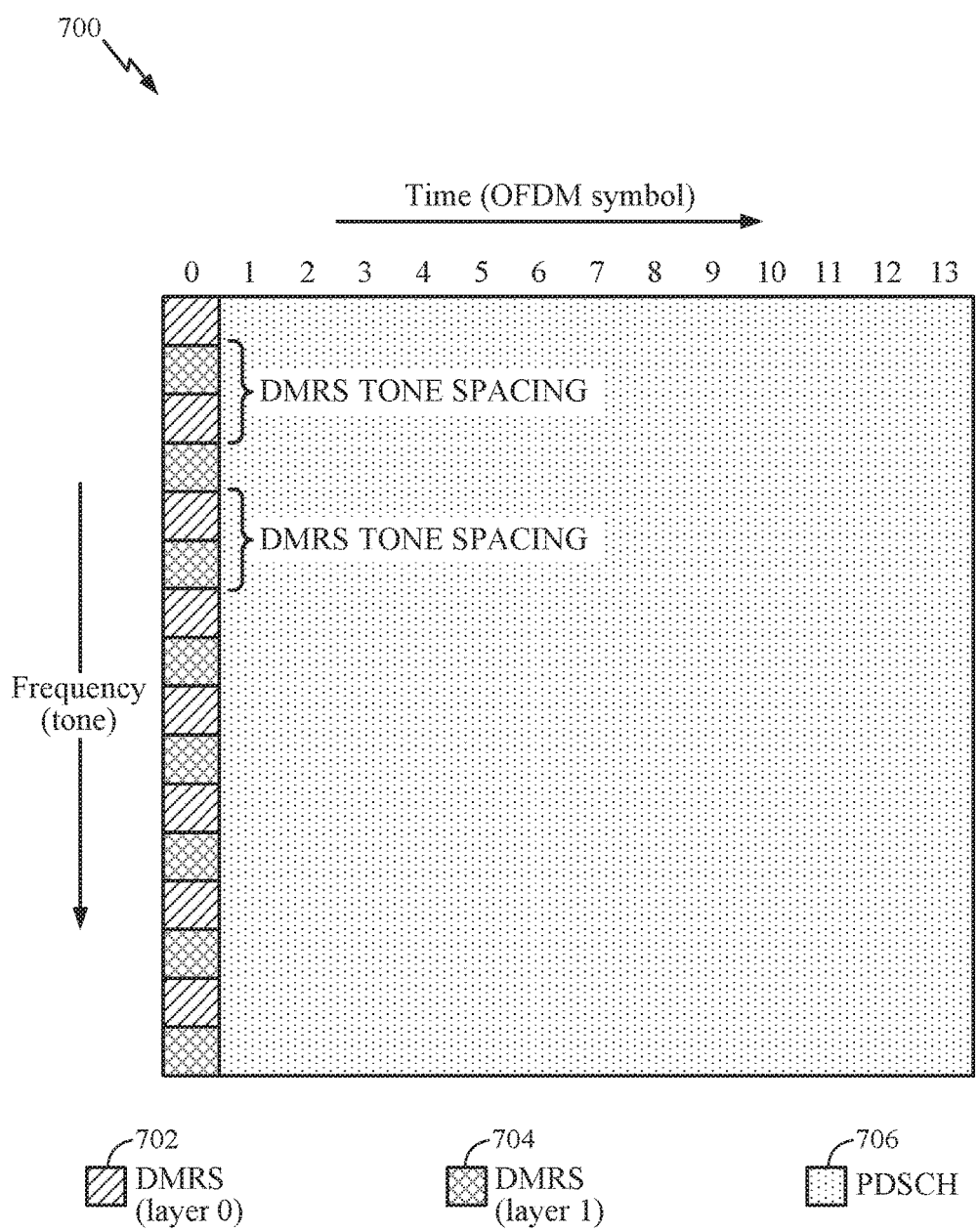
FIG. 7 illustrates a DMRS pattern 700 corresponding to two MIMO layers.

For example, FIG. 7 illustrates a DMRS pattern 700 corresponding to two MIMO layers. As shown, the DMRS pattern 700 includes DMRS for two MIMO layers, DMRS 702 corresponding to layer 0, and DMRS 704 corresponding to layer 1. The DMRS 702 and the DMRS 704 are frequency division multiplexed in OFDM symbol 0. As shown, DMRSs 702 and 704 are scheduled in adjacent subcarriers in the frequency domain. The multiplexed DMRS pattern in symbol 0 is followed by PDSCH 706.

Generally, the DRMS tone spacing is chosen to be small enough in the frequency domain so that the channel (e.g., PDSCH 706) may be reliably estimated. For example, a larger delay spread of the channel generally requires a denser DMRS pattern in the frequency domain. For example, the inverse of the DMRS tone spacing needs to be larger than the delay spread of the channel to be decoded, denoted for example by, $\tau_d$. $\tau_d$ may denote the maximum delay spread that is anticipated in any channel to be decoded using the DMRS pattern (e.g., DMRS pattern 700).

Figure 8:
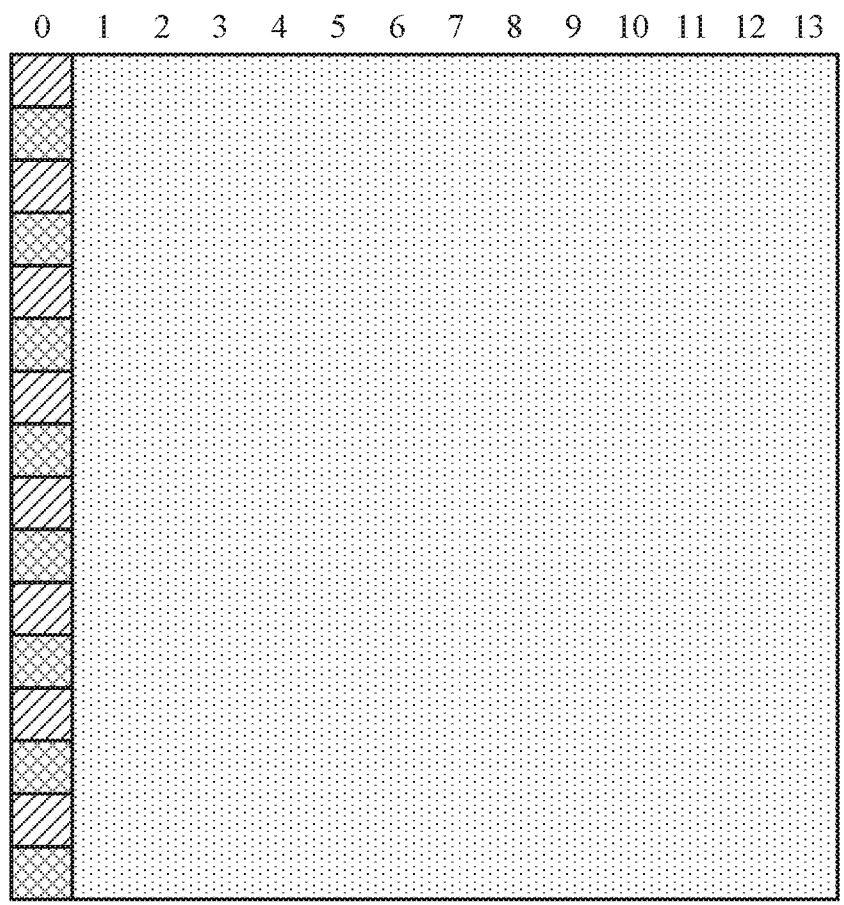
FIG. 8 illustrates a DMRS pattern 800 corresponding to four MIMO layers.

If the inverse of the DMRS tone spacing is chosen to be large enough (i.e., pilot tone spacing is chosen to be dense enough) so that a channel with twice the delay spread (e.g., $2*\tau_d$) may be estimated reliably by the UE, then DMRS for two more layers may be multiplexed in one OFDM symbol. For example, DMRS corresponding to two layers may be multiplexed in each of two multiplexing groups using time domain cyclic (or circular) shifts. FIG. 8 illustrates a DMRS pattern 800 corresponding to four MIMO layers. As shown, multiplexing group 1 multiplexes DMRS 802 corresponding to layer 0 and layer 2, and multiplexing group 2 multiplexes DMRS 804 corresponding to layer 1 and layer 3. The DMRS corresponding to layers of each of the multiplexing groups 1 and 2 are multiplexed within the group using time domain cyclic shifts. It may be noted that time domain cyclic shifts corresponds to frequency domain phase rotation. As shown, the two multiplexing groups 1 and 2 are FDM in OFDM symbol 0.

Figure 9:
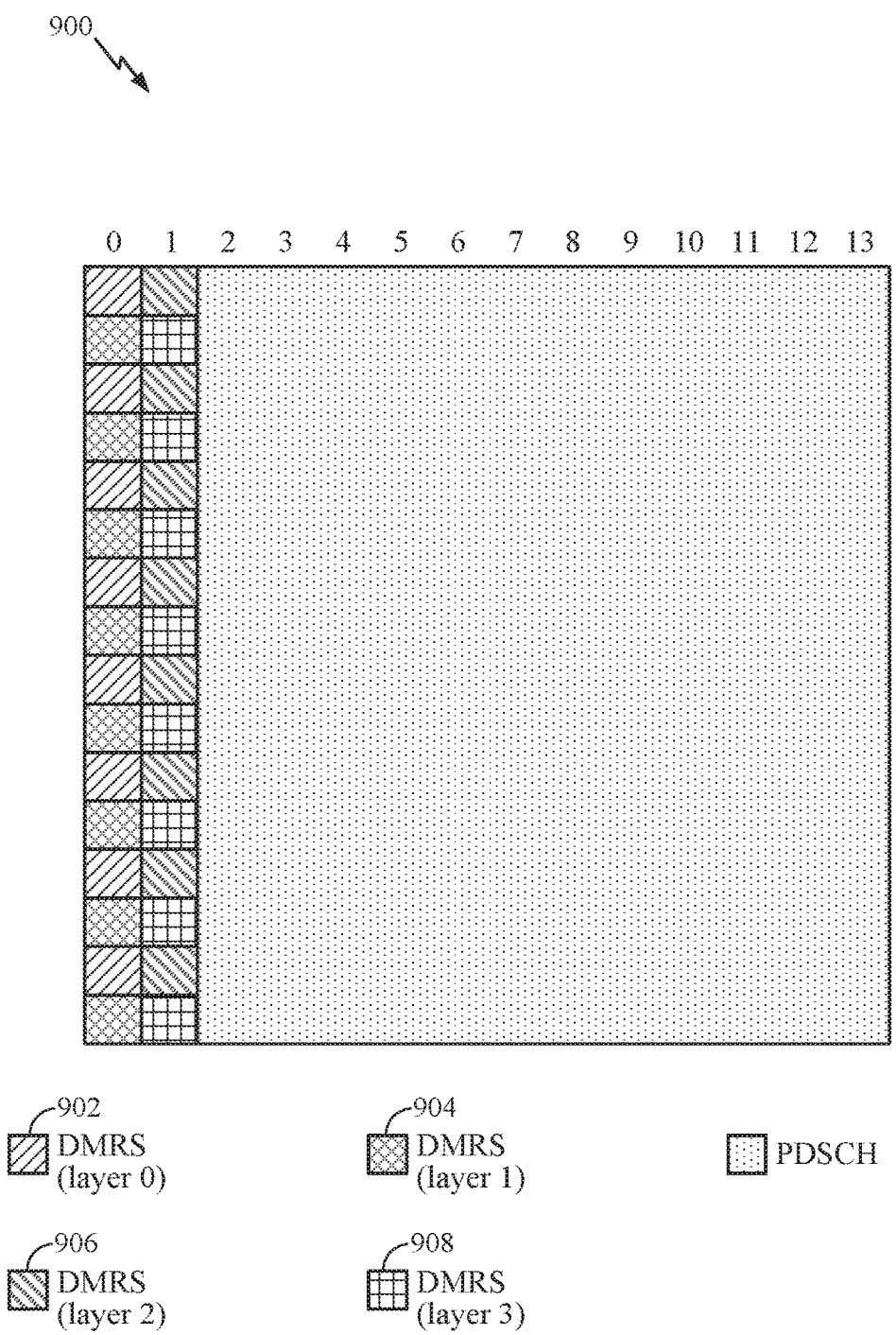
FIG. 9 illustrates a DMRS pattern 900 that multiplexes DMRS corresponding to four MIMO layers over two OFDM symbols.

However, if the inverse of the DMRS tone spacing is not enough (e.g., DMRS tone spacing is not dense enough) for the UE to estimate the channel with delay spread $2*\tau_d$, DMRS corresponding to all four layers may not be multiplexed in one OFDM symbol. One way to solve this problem is to use two OFDM symbols to transmit DMRS for the four layers, each OFDM symbol multiplexing DMRS for two of the four layers. For example, FIG. 9 illustrates a DMRS pattern 900 that multiplexes DMRS corresponding to four MIMO layers over two OFDM symbols. As shown, DMRS 902 corresponding to layer 0 is FDM with DMRS 904 corresponding to layer 1 in OFDM symbol 0. DMRS 906 corresponding to layer 2 is FDM with DMRS 908 corresponding to layer 3 in OFDM symbol 1.

However, in certain aspects, transmitting DMRS for the four layers over two symbols may lead to power imbalance. For example, when the transmit power allocated to layers 0 and 1 is not same as the transmit power allocated to layers 2 and 3, there may be transmit power variation over time. This power imbalance may cause performance degradation in terms of waveform quality at the transmitter.

Certain aspects of the present disclosure discuss techniques for multiplexing DMRS corresponding to multiple MIMO layers that achieve at least one of improving channel estimation, randomizing interference, supporting channels with high Doppler, supporting channels with large delay spread, or improving power imbalance.

In certain aspects, the problem of power imbalance, as discussed with reference to FIG. 9 may be solved by using staggered DMRS resources (e.g., REs) over time, for example, staggered in frequency domain over multiple OFDM symbols.

FIG. 10 illustrates example operations 1000 that may be performed by an eNB (e.g., eNB 610 shown in FIG. 6) for assigning DMRS resources, in accordance with certain aspects of the present disclosure. Operations 1000 begin, at 1002, by assigning resources for DMRS corresponding to each of two or more data streams (or layers), wherein resources assigned to each of the data streams are staggered in frequency and span two or more OFDM symbols. At 1004, the base station transmits the DMRS using the assigned resources.

Figure 11:
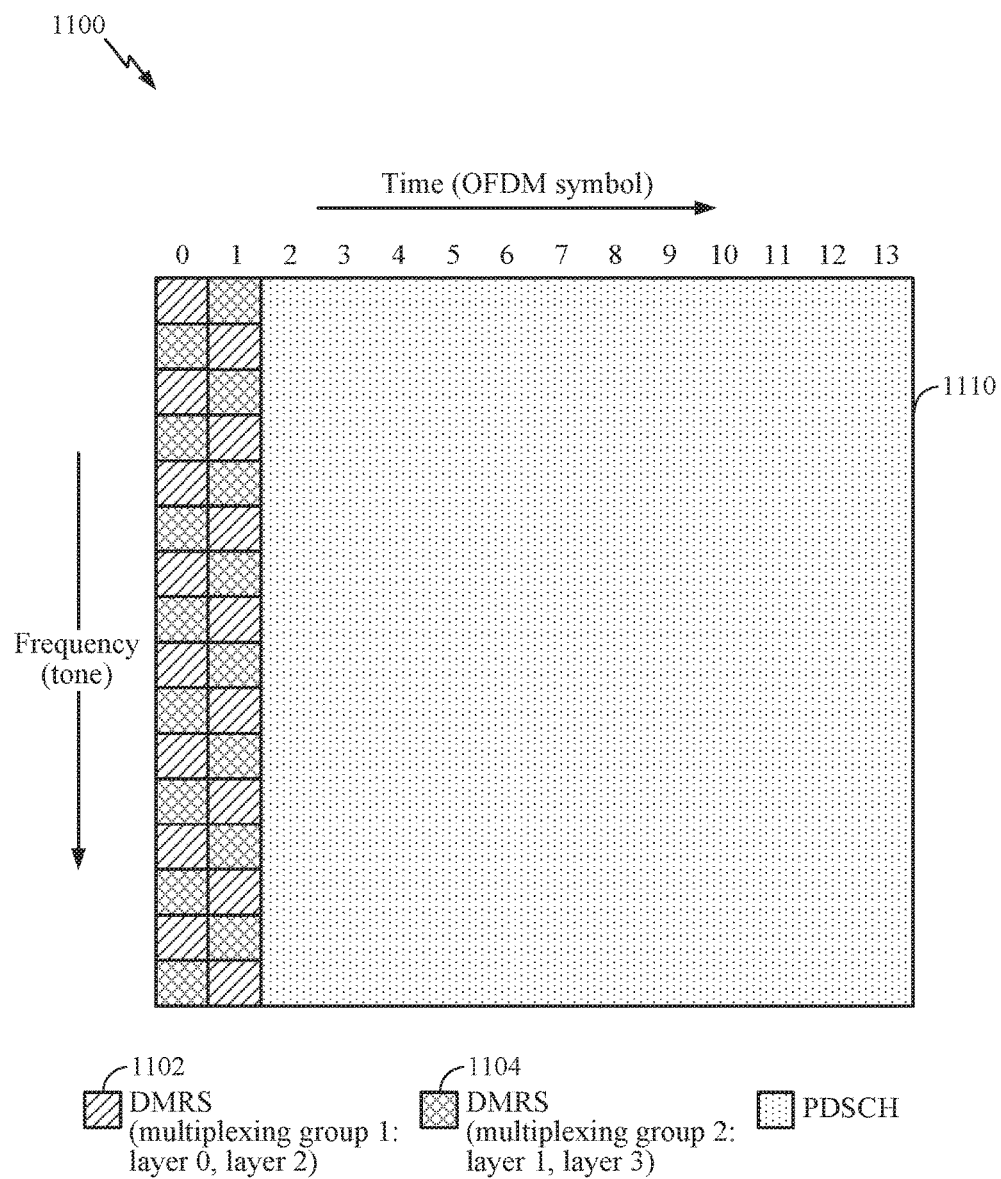
FIG. 11 illustrates DMRS pattern 1100 corresponding to four MIMO layers, that uses DMRS REs staggered in the frequency domain and that span over two OFDM symbols, in accordance with certain aspects of the present disclosure.

For example, FIG. 11 illustrates DMRS pattern 1100 corresponding to four MIMO layers, that uses DMRS REs staggered in the frequency domain and spanning over two OFDM symbols, in accordance with certain aspects of the present disclosure. In an aspect, by staggering the DMRS REs for a layer over two OFDM symbols, full frequency density is achieved. As shown, multiplexing group 1 multiplexes DMRS 1102 corresponding to layers 0 and 2, and multiplexing group 2 multiplexes DMRS 1104 corresponding to layers 1 and 3. DMRS for each layer is staggered in frequency and spans two OFDM symbols 0 and 1 (instead of one symbol as shown in FIG. 9) of the RB 1110. For example, as shown, DMRS 1102 corresponding to layers 0 and 2 are multiplexed together using time-domain cyclic shifts over the two OFDM symbols 0 and 1. Similarly DMRS 1104 corresponding to layers 1 and 3 are multiplexed together using time-domain cyclic shifts over the two OFDM symbols 0 and 1. In an aspect, on the first OFDM symbol, the frequency domain offset is applied to DMRS for each layer, so that essentially, the tone spacing of the DMRS for each layer is reduced. By staggering REs denser pattern may be achieved in the frequency domain to support larger delay spreads. In an aspect, this structure has a higher DMRS density in frequency in comparison to Orthogonal Cover Code (OCC)-based design, and therefore, is expected to be more robust to a large delay spread. Further, since the first and second OFDM symbols have the same number of layers, the problem of power variation is also solved.

Figure 12:
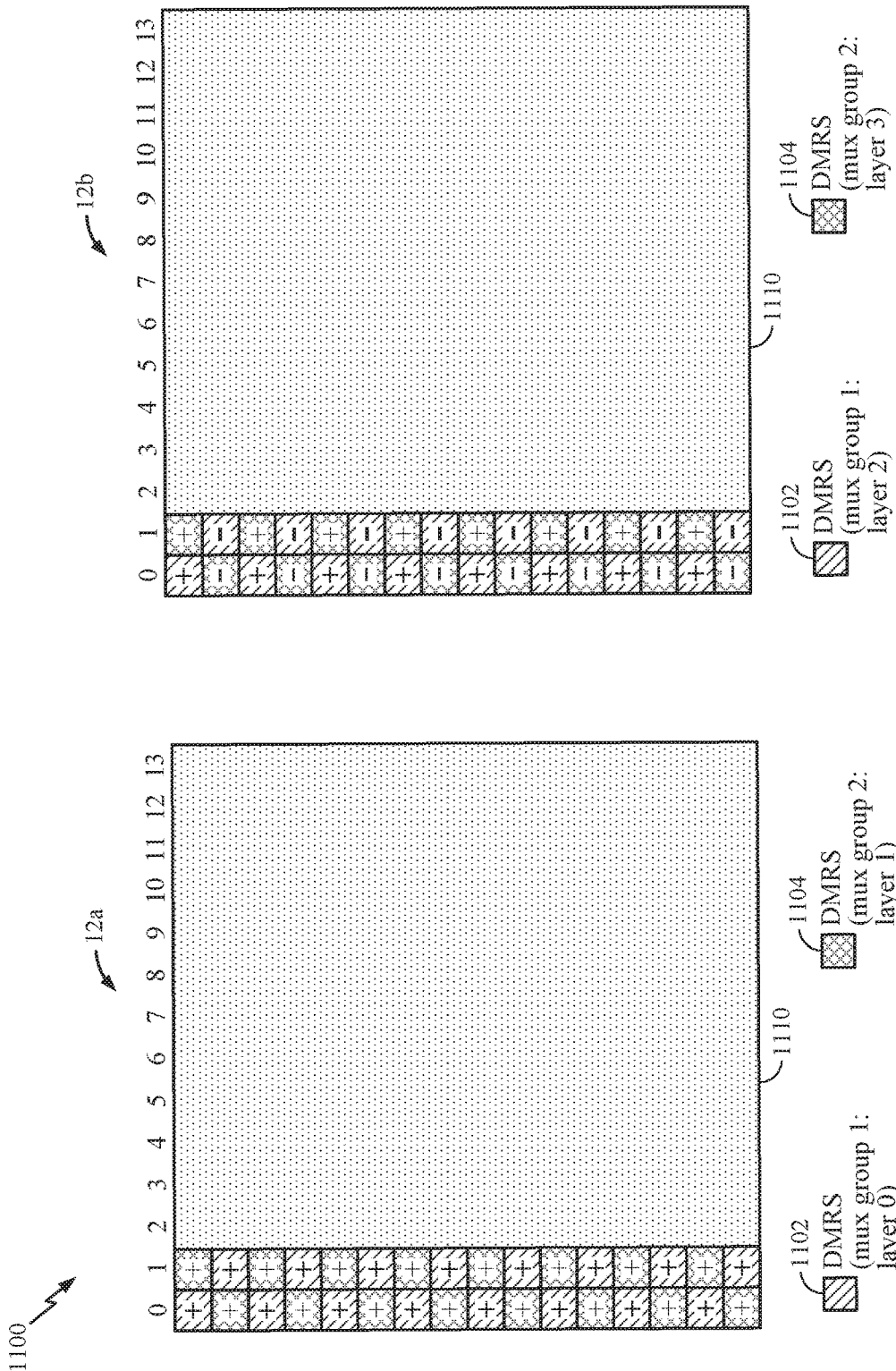
FIG. 12 illustrates code sequence used for DMRS corresponding to each layer shown in FIG. 11, in accordance with certain aspects of the present disclosure.

FIG. 12 illustrates the DMRS pattern 1100 of FIG. 11 showing code sequence used for DMRS corresponding to each layer shown in FIG. 11, in accordance with certain aspects of the present disclosure. 12a shows code sequence used for DMRS corresponding to layers 0 and 1, and 12b shows code sequence used for DMRS corresponding to layers 2 and 3. As shown, the time-domain cyclic shifts are achieved by phase ramping in frequency domain. It may be noted that the phase ramp applied to the DMRS tones may be viewed as a frequency-domain code sequence assigned to the DMRS. The '+' and '−' of the code sequences achieve the cyclic shifts in the time domain for multiplexing the layers of each of the multiplexing groups 1 and 2. Here, the symbol '+' represents positive one, while the symbol '−' represents a negative one. For example, the layer 0 and 2 of group 1 are multiplexed together by assigning a frequency domain code sequence of (+,+,+,+,+,+,+,+,+,+,+,+,+,+,+,+) to the DMRS tones of the layer 0, and frequency domain code sequence of (+,−,+,−,+,−,+,−,+,−,+,−,+,−,+,−) to the DMRS tones of the layer 2. Similarly, the layer 1 and 3 of group 2 are multiplexed by applying frequency domain code sequence of (+,+,+,+,+,+,+,+,+,+,+,+,+,+,+,+) to the DMRS tones of the layer 1, and frequency domain code sequence of (+,−,+,−,+,−,+,−,+,−,+,−,+,−,+,−) to the DMRS tones of the layer 3.

In certain aspects, the reference signal sequence for each layer is obtained by a product of the code sequence for the layer and the base sequence common to all the layers. The base sequence can be a Zad-off Chu sequence, as in LTE uplink DMRS, or a QPSK sequence based on pseudo-random sequence.

Figure 13:
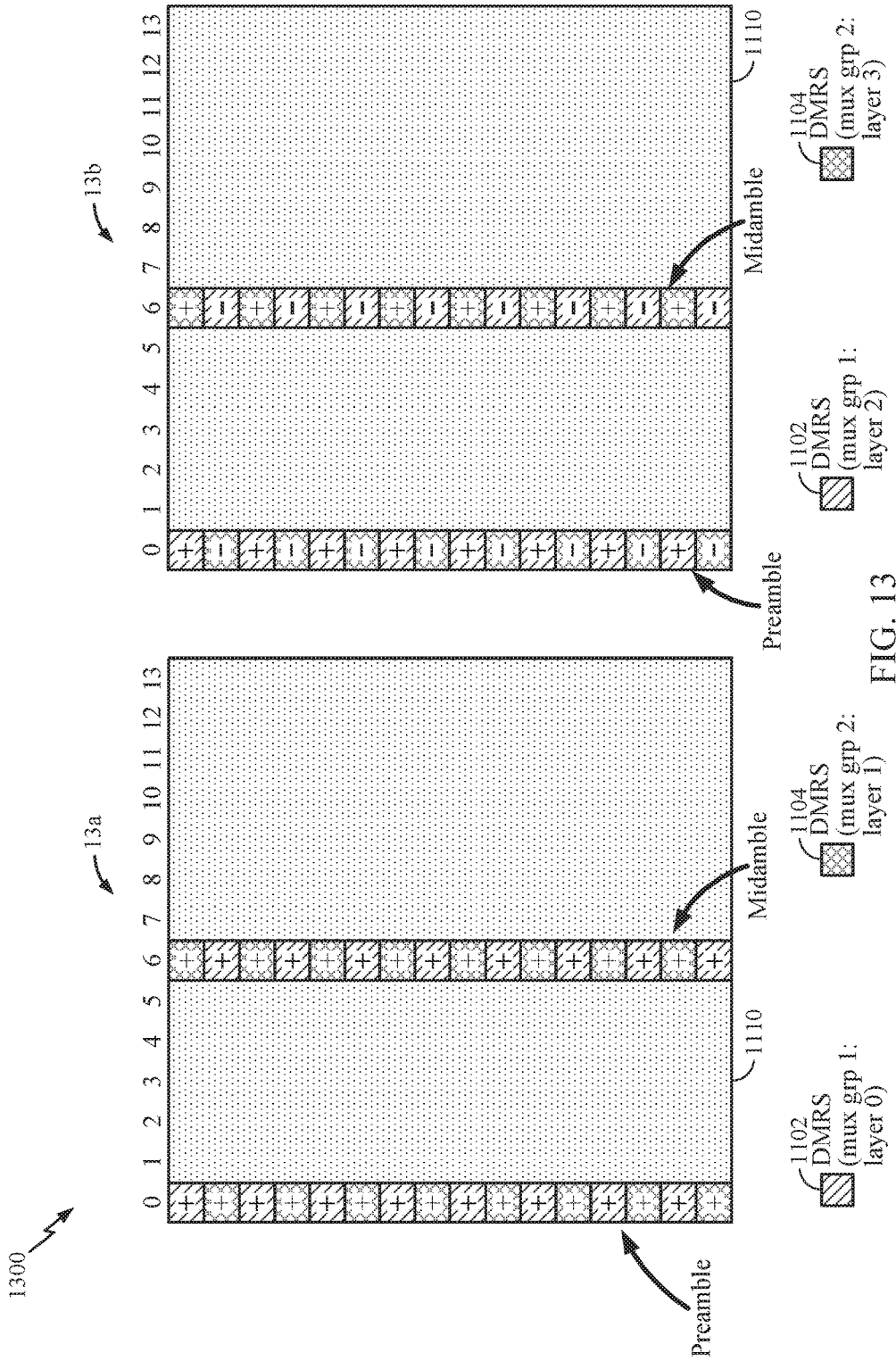
FIG. 13 illustrates DMRS pattern 1300 used for DMRS corresponding to four MIMO layers that supports channels with high Doppler, in certain aspects of the present disclosure.

In certain aspects, the DMRS pattern 1100 illustrated in FIGS. 11 and 12 is better suited for scenarios with little or no Doppler, e.g., WiFi-like scenarios. To handle channels with high Doppler, OFDM symbols carrying the DMRS may be separated in time by one or more symbols to allow the channel estimation for high Doppler scenarios. FIG. 13 illustrates DMRS pattern 1300 used for DMRS corresponding to four MIMO layers that supports channels with high Doppler, in certain aspects of the present disclosure. 13a shows code sequences used for DMRS corresponding to layers 0 and 1, and 13b shows code sequences used for DMRS corresponding to layers 2 and 3. The code sequence used for each of the layers is identical to that shown in FIG. 12, but the two OFDM symbols are separated in time. For example, as shown, symbols 0 and 6 of the RB 1110 are used instead of symbols 0 and 1 as shown in FIG. 12.

In certain aspects, a problem with DMRS pattern 1300 is that the channel estimation should be non-causal processing, since the UE needs to observe both OFDM symbols before it may separate the DMRSs for each of the layers to perform channel estimation and decode the PDSCH channel. This may not be ideal for situations in which the UE needs to quickly decode a channel and send back an acknowledgement message to the transmitter.

For causal processing, a UE may need to be able to separate the DMRS for each layer using just one of the OFDM symbols. However, in such a case the maximum supported delay spread may be halved. In certain aspects, for causal processing, the code sequence may be changed so that it is sufficient to receive one OFDM symbol to perform channel estimation and decode packets of data. In an aspect, DMRS corresponding to layers may be multiplexed together using time-domain cyclic shifts over each OFDM symbol, instead of over multiple OFDM symbols as discussed previously.

Figure 14:
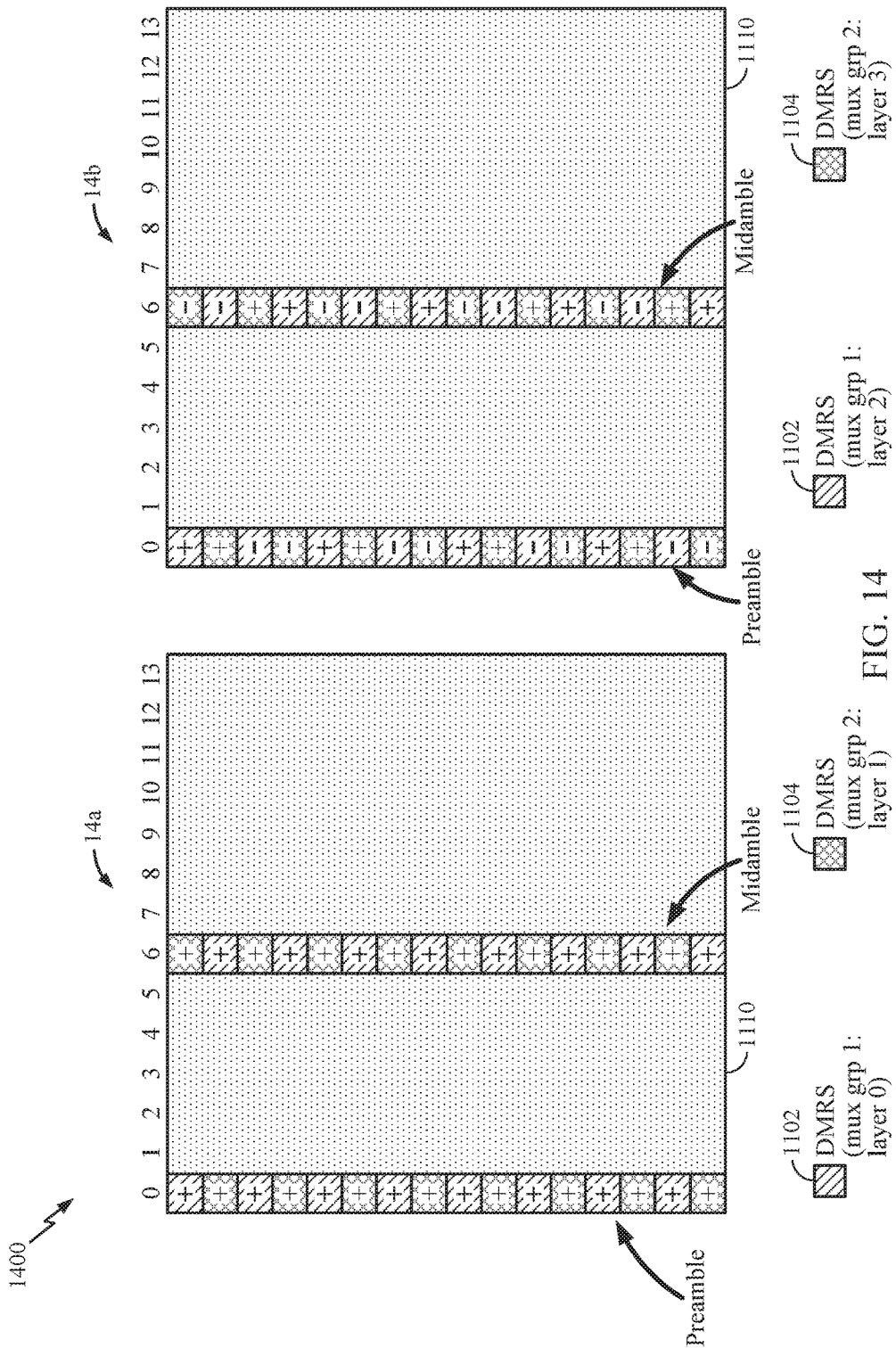
FIG. 14 illustrates DMRS pattern 1400 used for DMRS corresponding to four MIMO layers for causal processing, in certain aspects of the present disclosure.

FIG. 14 illustrates DMRS pattern 1400 used for DMRS corresponding to four MIMO layers for causal processing, in certain aspects of the present disclosure. In this example, for causal processing, for OFDM symbols 1 to 5, the channel estimation using DMRS in OFDM symbol 0 is used, and for OFDM symbol 7 to 13, the channel estimation using DMRS in OFDM symbols 0 and 6 is used. DMRS pattern 1400 may be also used for partial non-causal processing. For partial non-causal processing, for OFDM symbols 1 to 2, the channel estimation using DMRS in OFDM symbol 0 is used, and for OFDM symbol 3 to 13, the channel estimation using DMRS in OFDM symbols 0 and 6 is used. Partial non-causal processing provides more accurate channel estimation than causal processing, at the cost of higher receiver complexity. 14a shows code sequences used for DMRS corresponding to layers 0 and 1, and 14b shows code sequences used for DMRS corresponding to layers 2 and 3. The symbol '+' represents positive one, while the symbol '−' represents negative one.) As shown, the code sequence used for DMRS corresponding to each layer is chosen such that, DMRS corresponding to layers 0 and 2 (group 1) are multiplexed together using time-domain cyclic shifts (represented by frequency domain code sequence of (+,+,+,+,+,+,+,+) for the layer 0, and (+,−,+,−,+,−, +,−) or (−,+,−,+,−,+,−,+) for the layer 2), over each OFDM symbol 0 and 6, and DMRS corresponding to layers 1 and 3 (group 2) are multiplexed together using time-domain cyclic shifts over each of the OFDM symbols 0 and 6 (represented by frequency domain code sequence of (+,+,+,+,+,+,+,+) for the layer 1, and (+,−,+,−,+,−,+,−) or (−,+,−,+,−,+,−,+) for the layer 3). In an aspect, as shown, the same code sequence is used for each layer in the preamble in symbol 0 and the midamble in symbol 6. For example, in OFDM symbol 0, there are 8 DMRS tones for both the layer 0 and the layer 2. The frequency response of the channel observed at the DMRS for the layer 0 and 2 can be viewed as 8 point FFT of the sum of the time-domain channel impulse response (CIR) for the layer 0, and the CIR for the layer 1 that is cyclically shifted by 4 taps. If the CIR for each layer spans about 4 taps, and does not overlap in time with each other, it is possible to separate the channel estimate for each layer by applying a proper channel estimation technique. Notice that cyclic shift of 4 taps correspond to the phase ramp of (+,−,+,−,+,−,+,−) in frequency domain. See Chapter 8 of "Discrete-Time Signal Processing" by A. V. Oppenheim and R. W. Schafer for more explanation.

Figure 15:
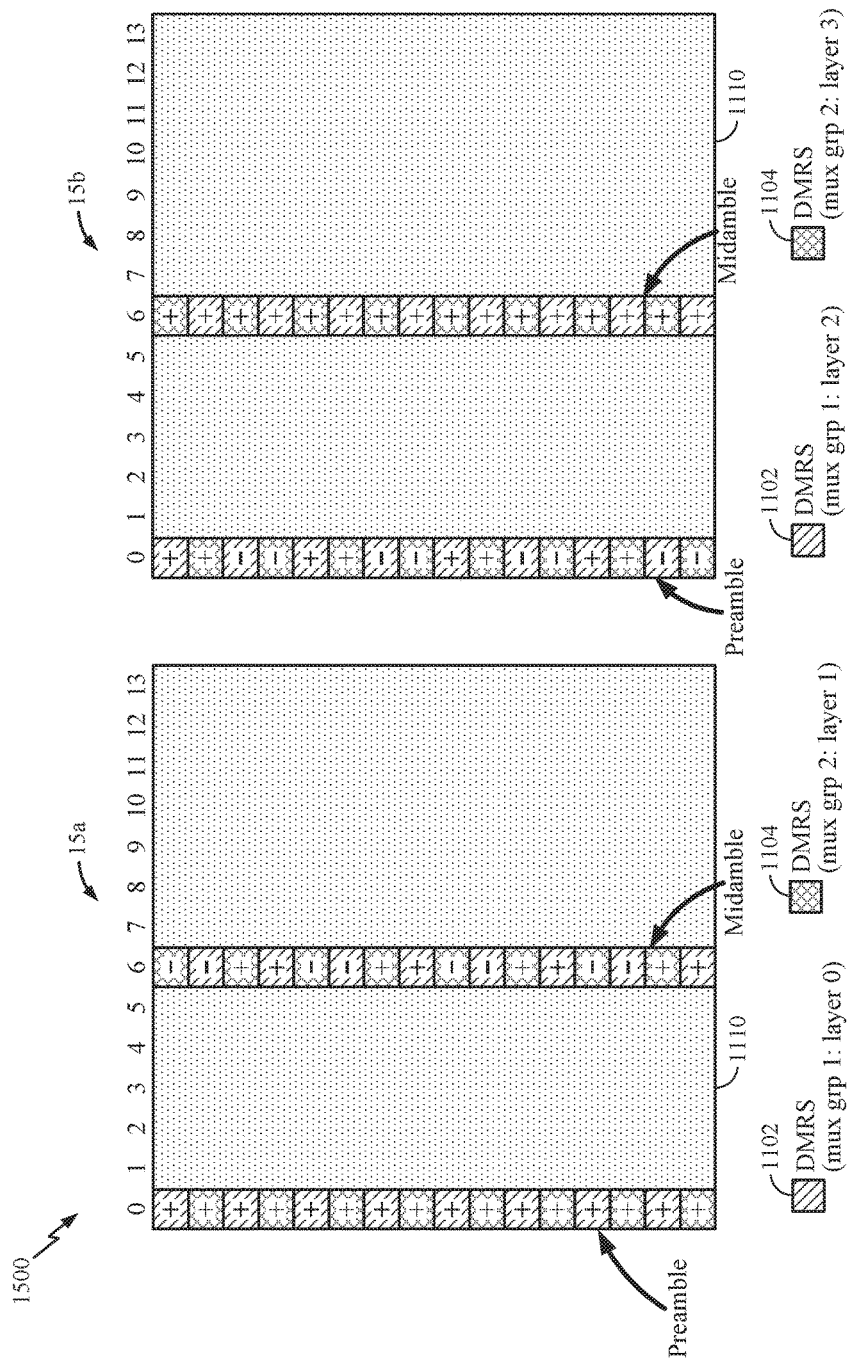
FIG. 15 illustrates DMRS pattern 1500 used for DMRS corresponding to four MIMO layers to achieve code sequence randomization, in certain aspects of the present disclosure.

In certain aspects, to cause more randomized interference to other cells, different code sequences may be assigned to each layer in the preamble and the midamble. This may be referred to as code sequence randomization. FIG. 15 illustrates DMRS pattern 1500 used for DMRS corresponding to four MIMO layers to achieve code sequence randomization, in certain aspects of the present disclosure. 15a shows code sequences used for DMRS corresponding to layers 0 and 1, and 15b shows code sequences used for DMRS corresponding to layers 2 and 3. The symbol '+' represents positive one, while the symbol '−' represents negative one. As shown, DMRS for each layer uses a different code sequence in the preamble and the midamble. In an aspect, as shown, code sequences used for layers 0 and 1 in the preamble are assigned to layers 2 and 3 respectively in the midamble, and code sequences used for layers 2 and 3 in the preamble are assigned to layer 0 and 1 in the midamble.

Figure 16:
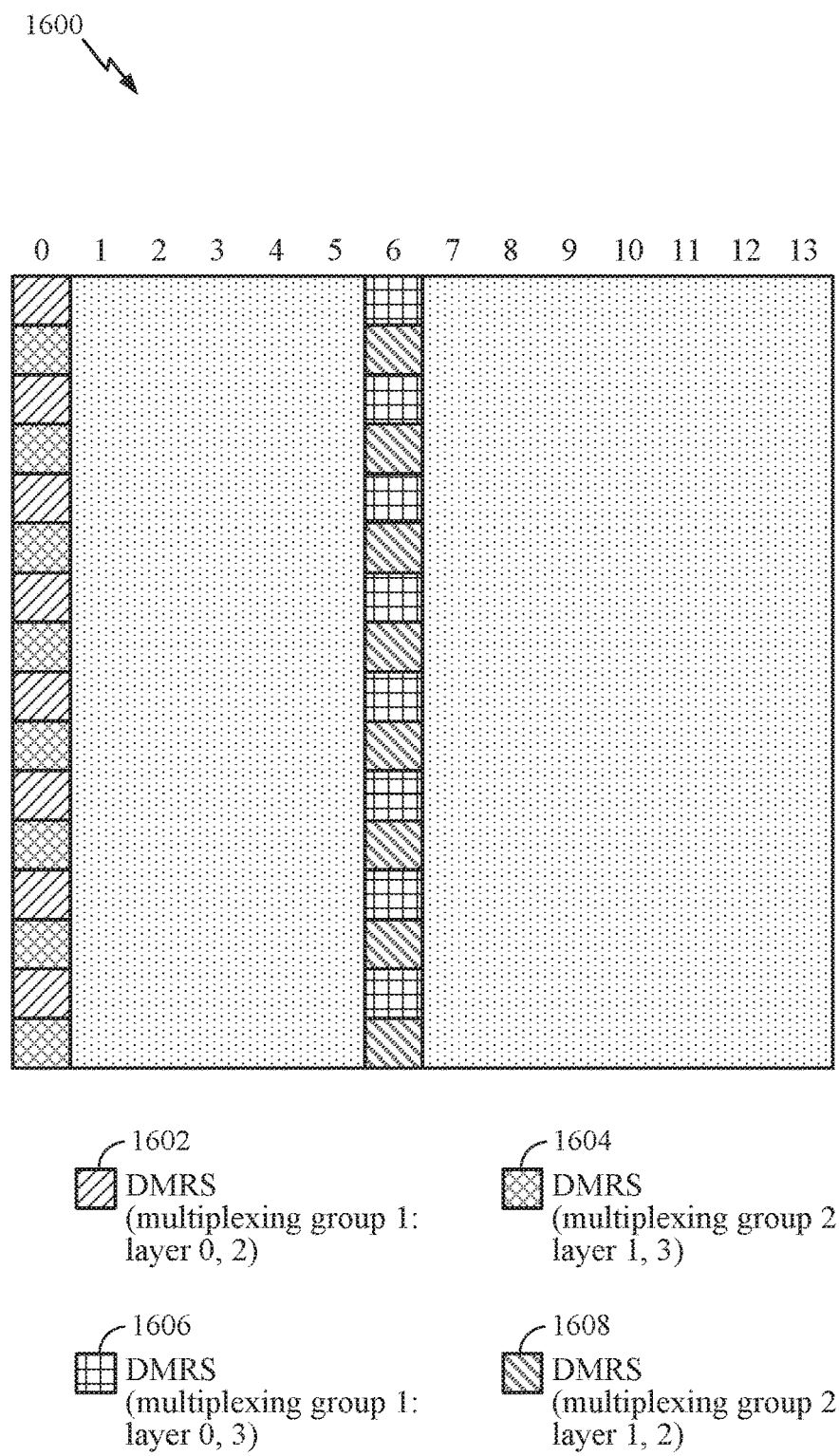
FIG. 16 illustrates DMRS pattern 1600 for DMRS corresponding to four MIMO layers to achieve multiplexing group randomization, in certain aspects of the present disclosure.

In certain aspects, rather than assigning the same multiplexing group to each layer in multiple OFDM symbols, a different multiplexing group may be assigned to each layer in different OFDM symbols. This technique may be referred to as multiplexing group randomization. This may achieve diversity gain in terms of channel estimation mean square error (MSE), by avoiding certain layers being assigned to a more crowded multiplexing group. In an aspect, the mapping of a layer to a multiplexing group may depend on subframe number, and it may be common to the cell. FIG. 16 illustrates DMRS pattern 1600 for DMRS corresponding to four MIMO layers to achieve multiplexing group randomization, in certain aspects of the present disclosure. As shown, in symbol 0, DMRS 1602 corresponding to layers 0 and 2 is assigned to group 1, and DMRS 1604 corresponding to layers 1 and 3 is assigned to group 2. In symbol 6, DMRS 1606 corresponding to layers 0 and 3 is assigned to group 1, and DMRS corresponding to layers 1 and 2 is assigned to group 2. Thus, layer 0 is assigned to multiplexing group 1 in both preamble and midamble, layer 1 is assigned to multiplexing group 2 in both preamble and midamble, layer 2 is assigned to multiplexing group 1 in the preamble and multiplexing group 2 in the preamble, and layer 3 is assigned to multiplexing group 2 in the preamble and multiplexing group 1 in the midamble.

In certain aspects, while the above description discusses multiplexing DMRS corresponding to multiple layers over two OFDM symbols, these techniques may be extended to DMRS multiplexed over any number of OFDM symbols.

Figure 17:
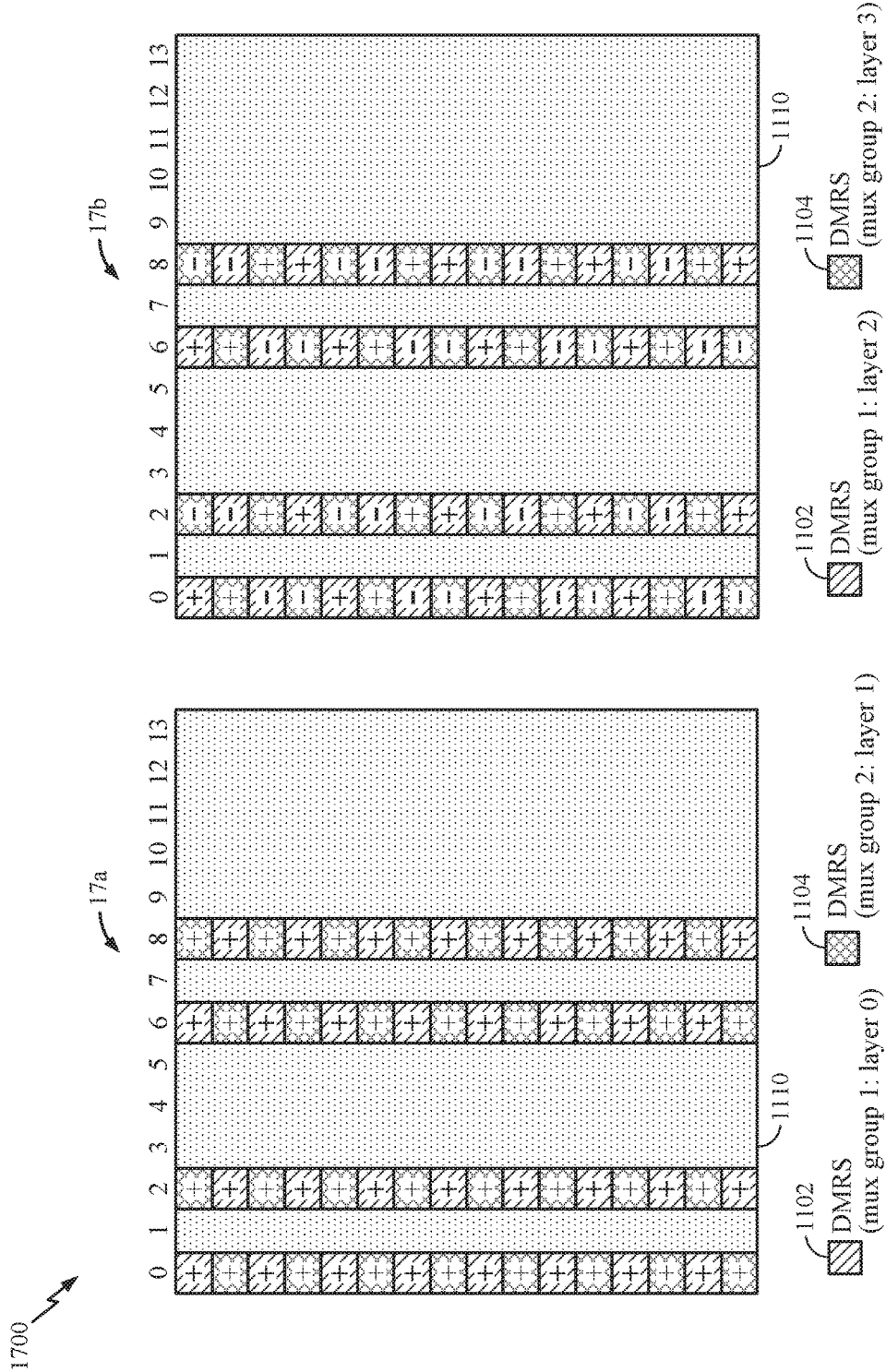
FIG. 17 illustrates DMRS pattern 1700 used for DMRS corresponding to four MIMO layers multiplexed over four OFDM symbols, in accordance with certain aspects of the present disclosure.

For example, FIG. 17 illustrates DMRS pattern 1700 used for DMRS corresponding to four MIMO layers multiplexed over four OFDM symbols, in accordance with certain aspects of the present disclosure. The layer to multiplexing group mapping of FIG. 17 is the same as shown in FIGS. 13-15. However, in FIG. 17, each layer is multiplexed over four OFDM symbols 0, 2, 6, and 8, instead of 2 symbols in FIGS. 13-15. In addition, the symbols are separated in time to support channels with high Doppler.

In this example, for causal processing, for OFDM symbol 1, the channel estimation using DMRS on OFDM symbol 0 is used. For OFDM symbols 3-5, the channel estimation using DMRS on OFDM symbols 0 and 2 is used. For OFDM symbol 7, the channel estimation using DMRS on OFDM symbols 0, 2, and 6 is used. For the rest of the PDSCH symbols, the channel estimation using DMRS on all four OFDM symbols 0, 2, 6, and 8 are used. 17a shows code sequences used for DMRS corresponding to layers 0 and 1, and 17b shows code sequences used for DMRS corresponding to layers 2 and 3. The symbol '+' represents positive one, while the symbol '−' represents negative one. As shown, to achieve causal processing, the code sequence used for DMRS corresponding to each layer is chosen such that, DMRS corresponding to layers 0 and 2 (group 1) are multiplexed together using time-domain cyclic shifts over each OFDM symbol 0, 2, 6, and 8, and DMRS corresponding to layers 1 and 3 (group 2) are multiplexed together using time-domain cyclic shifts over each OFDM symbol 0, 2, 6, and 8. In an aspect, as shown, the same code sequence is used for each layer in each OFDM symbol that contains DMRS.

In certain aspect, as discussed above, to achieve code sequence randomization, different code sequences may be assigned to each layer in each OFDM symbol that contains DMRS, to achieve inter-cell interference randomization.

Figure 18:
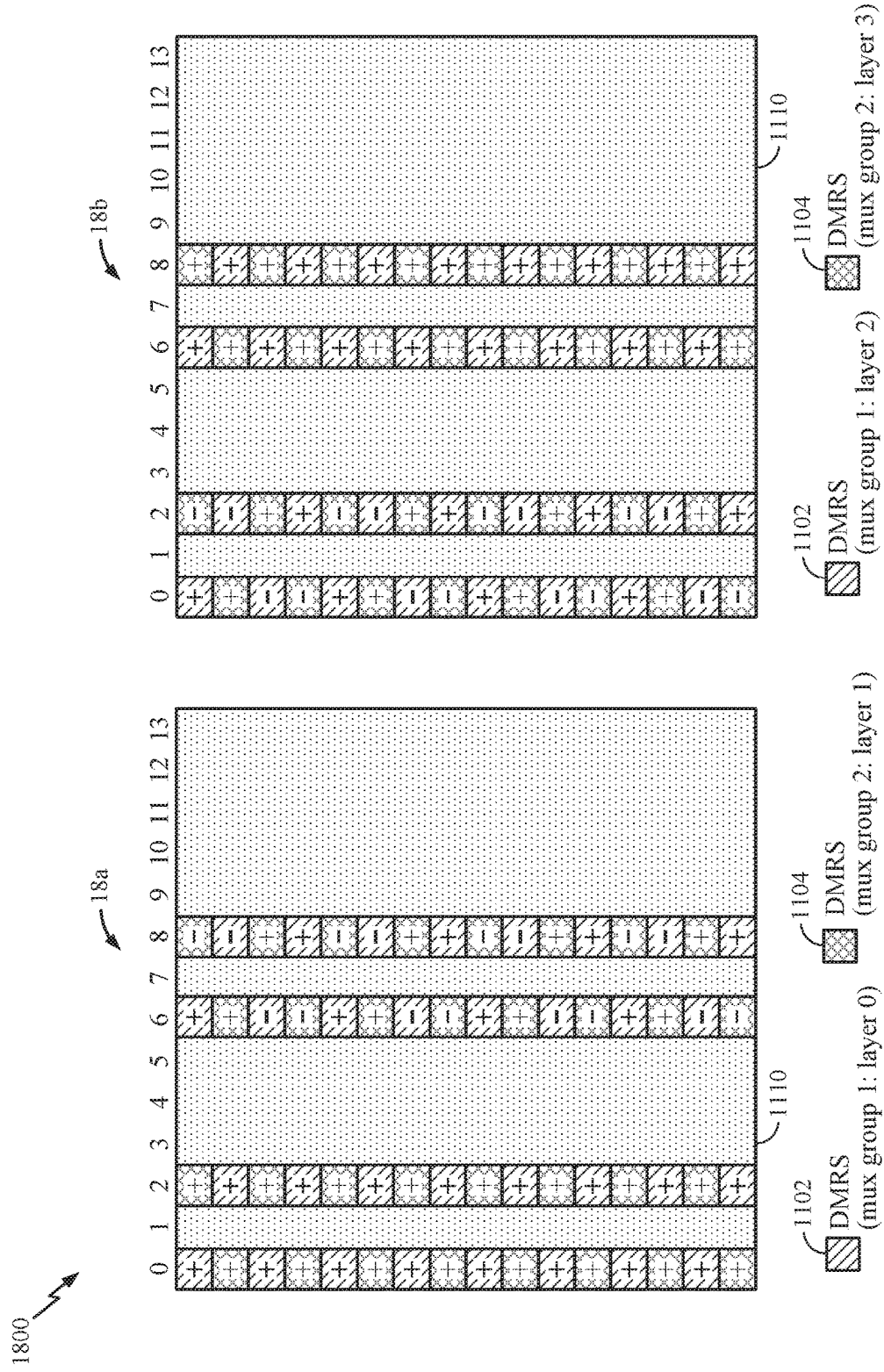
FIG. 18 illustrates DMRS pattern 1800 used for DMRS corresponding to four MIMO layers multiplexed over four OFDM symbols to achieve code sequence randomization, in accordance with certain aspects of the present disclosure.

FIG. 18 illustrates DMRS pattern 1800 used for DMRS corresponding to four MIMO layers multiplexed over four OFDM symbols to achieve code sequence randomization, in accordance with certain aspects of the present disclosure. 18*a* shows code sequences used for DMRS corresponding to layers 0 and 1, and 18b shows code sequences used for DMRS corresponding to layers 2 and 3. As shown, DMRS for each layer uses a different code sequence in each of the OFDM symbols 0, 2, 7, and 8. In an aspect, as shown, code sequences used for layer 0 and 1 in the OFDM symbols 0 and 2 are assigned to layers 2 and 3 in the OFDM symbols 6 and 8. Further, code sequences used for layers 2 and 3 in the OFDM symbols 0 and 2 are assigned to layers 0 and 1 in the OFDM symbols 6 and 8.

Figure 19:
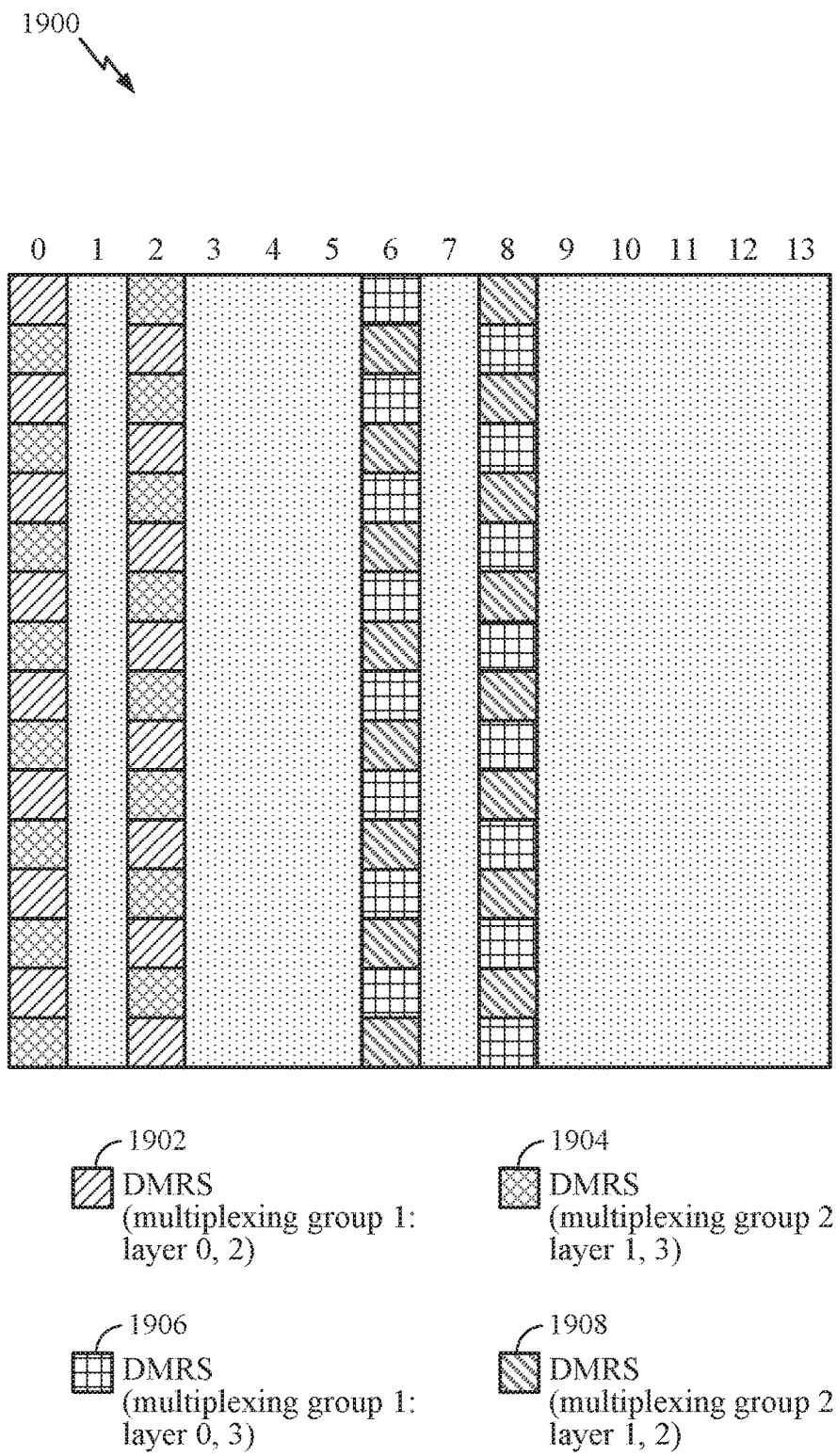
FIG. 19 illustrates DMRS pattern 1900 for DMRS corresponding to four MIMO layers multiplexed over four OFDM symbols to achieve multiplexing group randomization, in accordance with certain aspects of the present disclosure.

In certain aspects, as discussed above, in order to achieve multiplexing group randomization, a different multiplexing group may be assigned to each layer in different OFDM symbols carrying DMRS. FIG. 19 illustrates DMRS pattern 1900 for DMRS corresponding to four MIMO layers multiplexed over four OFDM symbols to achieve multiplexing group randomization, in accordance with certain aspects of the present disclosure. Thus, mapping of layer to multiplexing group may be different for each OFDM symbols that contains DMRS. In an aspect, the mapping may depend on subframe number and cell ID for randomization. As shown, for symbols 0 and 2, DMRS 1902 corresponding to layers 0 and 2 is assigned to group 1, and DMRS 1904 corresponding to layers 1 and 3 is assigned to group 2. In symbols 6 and 8, DMRS 1906 corresponding to layers 0 and 3 is assigned to group 1, and DMRS 1908 corresponding to layers 1 and 2 is assigned to group 2. Thus, layer 0 is assigned to multiplexing group 1 in both preamble (e.g., including symbols 0 and 2) and midamble (e.g., including symbols 6 and 8). Layer 1 is assigned to multiplexing group 2 in both preamble and midamble. Layer 2 is assigned to multiplexing group 1 in preamble and multiplexing group 2 in the midamble. Layer 3 is assigned to multiplexing group 2 in the preamble and multiplexing group 1 in the midamble.

Figure 20:
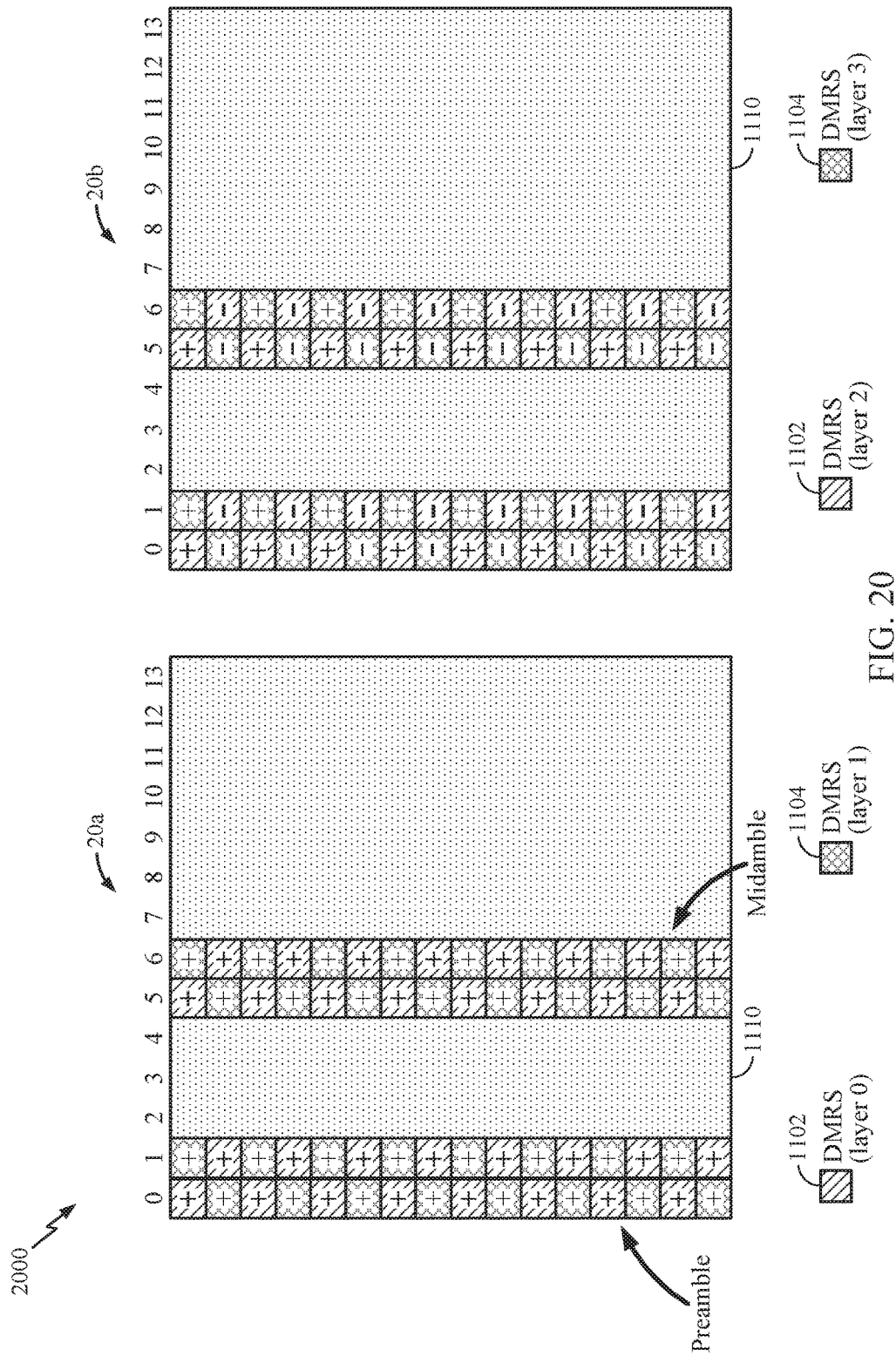
FIG. 20 illustrates DMRS pattern 2000 used for DMRS corresponding to four MIMO layers multiplexed over four OFDM symbols to support a large delay spread, in accordance with certain aspects of the present disclosure.

In certain aspects, as discussed above, a denser DMRS pattern in frequency may be used to support larger delay spreads. FIG. 20 illustrates DMRS pattern 2000 used for DMRS corresponding to four MIMO layers multiplexed over four OFDM symbols to support a large delay spread, in accordance with certain aspects of the present disclosure. The layer to multiplexing group mapping is same as shown in previous figures, for example, FIGS. 17-18. As shown, a denser DMRS pattern is used to support the larger delay spread. For example, symbols 0 and 1 are used as preamble and symbols 5 and 6 are used as midamble.

20*a* shows code sequences used for DMRS corresponding to layers 0 and 1, and 20b shows code sequences used for DMRS corresponding to layers 2 and 3. In this example, for causal processing, for OFDM symbols 2-4, the channel estimation using DMRS on OFDM symbols 0 and 1 is used. For OFDM symbols 7-13, the channel estimation using DMRS on OFDM symbols 0, 1, 5, and 6 is used. In an aspect, the same code sequence is used in the preamble and midamble for each layer.

Figure 21:
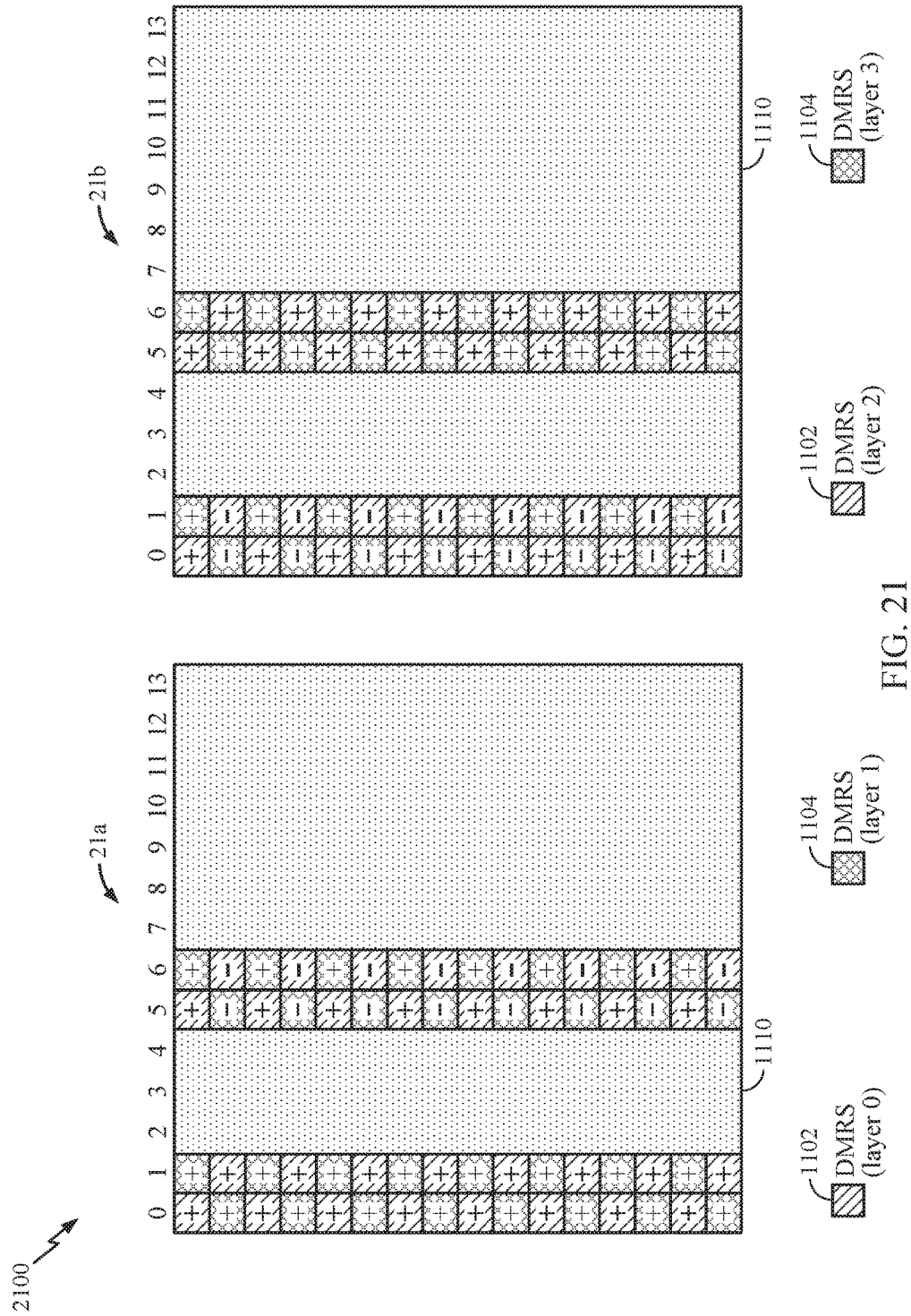
FIG. 21 illustrates DMRS pattern 2100 used for DMRS corresponding to four MIMO layers multiplexed over four OFDM symbols to achieve code sequence randomization, in accordance with certain aspects of the present disclosure.

In certain aspect, as discussed above, to achieve code sequence randomization, different code sequences may be assigned to each layer in the preamble and the midamble, to achieve inter-cell interference randomization. FIG. 21 illustrates DMRS pattern 2100 used for DMRS corresponding to four MIMO layers multiplexed over four OFDM symbols to achieve code sequence randomization, in accordance with certain aspects of the present disclosure. 21*a* shows code sequences used for DMRS corresponding to layers 0 and 1, and 21b shows code sequences used for DMRS corresponding to layers 2 and 3. In this example, code sequences used for layer 0 and 1 in the preamble are assigned to layers 2 and 3 in the midamble. Further, the code sequences used for layers 2 and 3 in the preamble are assigned to layers 0 and 1 in the midamble.

Figure 22:
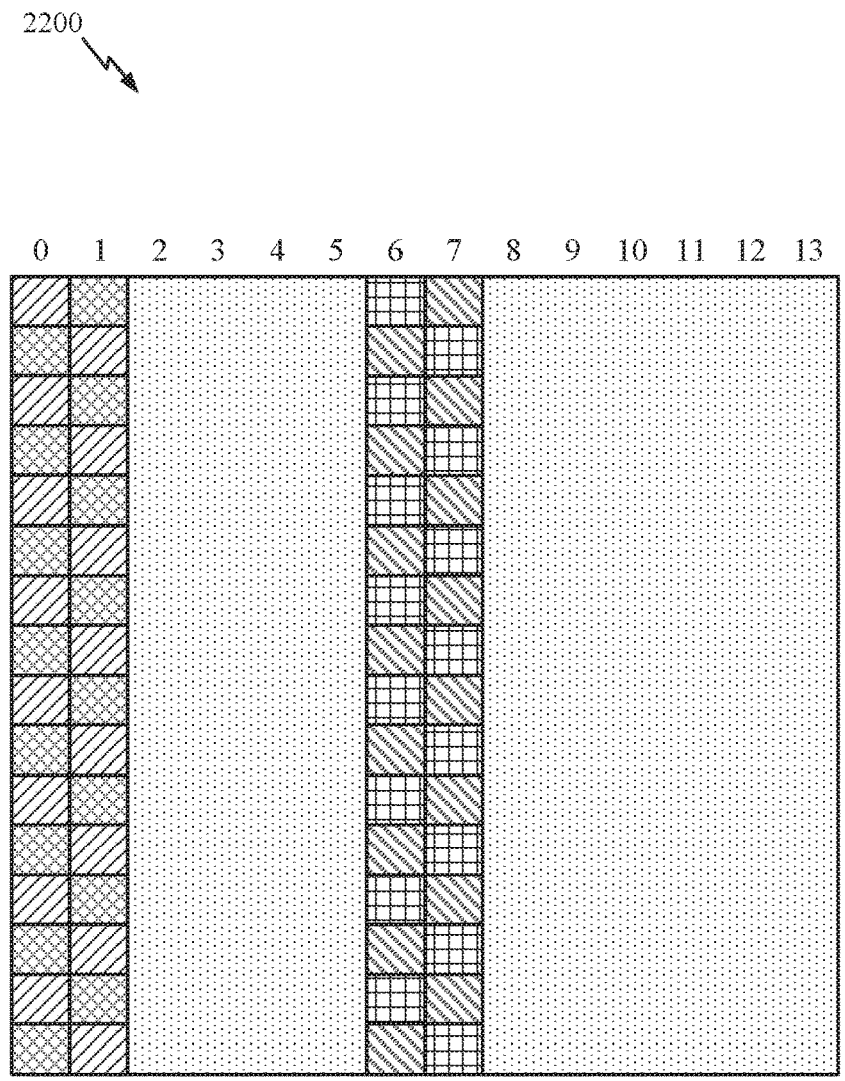
FIG. 22 illustrates DMRS pattern 2200 for DMRS corresponding to four MIMO layers multiplexed over four OFDM symbols to achieve multiplexing group randomization, in accordance with certain aspects of the present disclosure.

In certain aspects, as discussed above, in order to achieve multiplexing group randomization, a different multiplexing group may be assigned to each layer in the preamble and the midamble. FIG. 22 illustrates DMRS pattern 2200 for DMRS corresponding to four MIMO layers multiplexed over four OFDM symbols to achieve multiplexing group randomization, in accordance with certain aspects of the present disclosure. Thus, mapping of layer to multiplexing group for preamble is different from the mapping for the midamble. In an aspect, the mapping may depend on subframe number and cell ID for randomization. As shown, for symbols 0 and 1, DMRS 2202 corresponding to layers 0 and 2 is assigned to group 1, and DMRS 2204 corresponding to layers 1 and 3 is assigned to group 2. In symbols 6 and 7, DMRS 2206 corresponding to layers 0 and 3 is assigned to group 1, and DMRS 2208 corresponding to layers 1 and 2 is assigned to group 2. Thus, layer 0 is assigned to multiplexing group 1 in both preamble (e.g., including symbols 0 and 1) and midamble (e.g., including symbols 6 and 7). Layer 1 is assigned to multiplexing group 2 in both preamble and midamble. Layer 2 is assigned to multiplexing group 1 in preamble and multiplexing group 2 in the midamble. Layer 3 is assigned to multiplexing group 2 in the preamble and multiplexing group 1 in the midamble.

Figure 23:
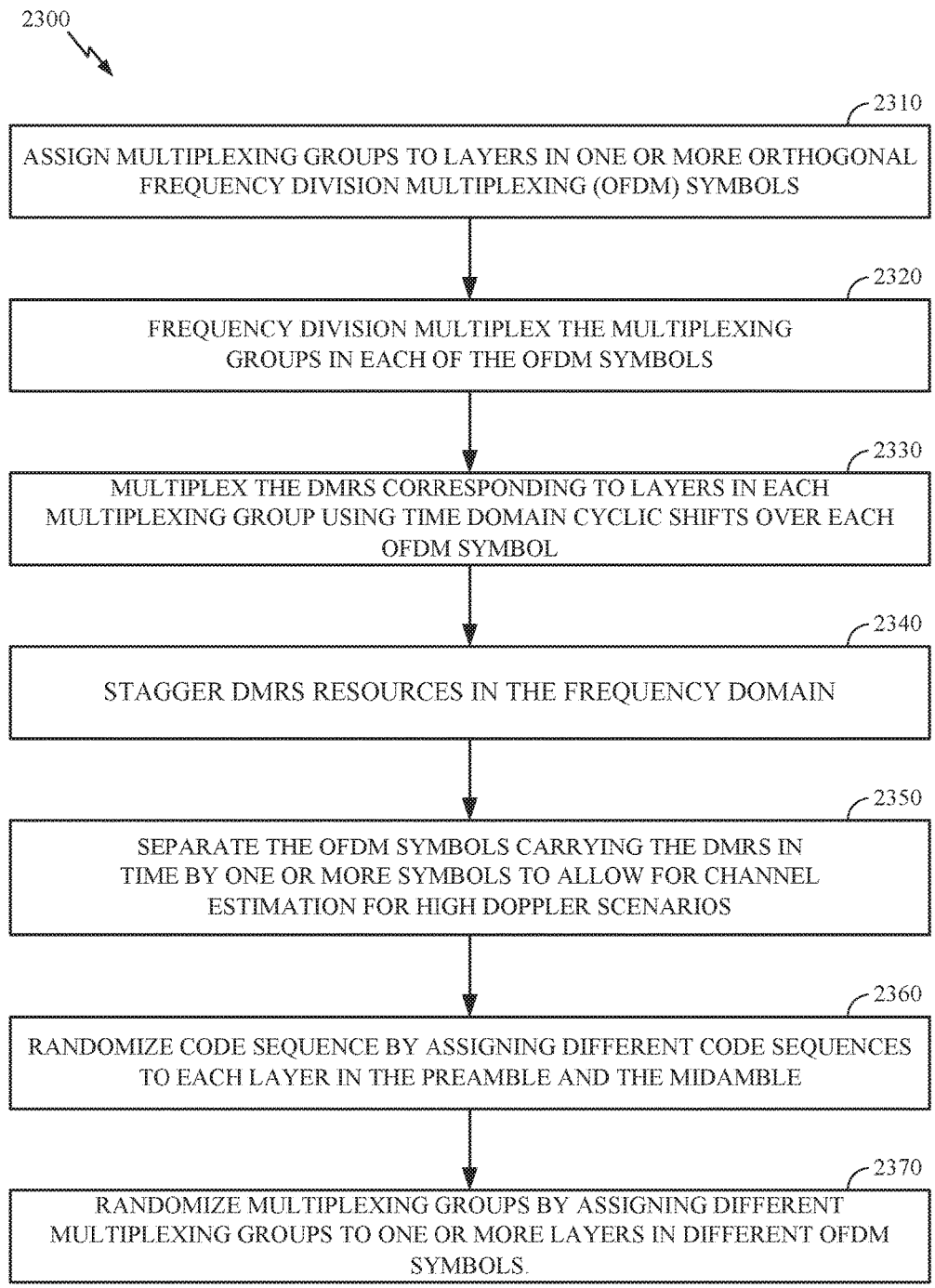
FIG. 23 illustrates example operations performed by a base station (BS) for assigning resources for DMRS corresponding to each of two or more layers, in accordance with certain aspects of the present disclosure.

FIG. 23 illustrates example operations 2300 performed by a base station (BS) for assigning resources for DMRS corresponding to each of two or more layers, in accordance with certain aspects of the present disclosure. Operations 2300 being, at 2310, by the base station assigning multiplexing groups to layers in one or more OFDM symbols. At 2320, the multiplexing groups in each of the OFDM symbols are frequency division multiplexed. At 2330, the base station multiplexes the DMRSs corresponding to layers in each multiplexing group together using time-domain cyclic shifts over each OFDM symbol. At 2340, the DMRS resource elements are staggered in the frequency domain. At 2350, the OFDM symbols carrying the DMRS are separated in time by one or more symbols to allow for channel estimation for high Doppler scenarios. At 2360, code sequence randomization is implemented by assigning different code sequences to each layer in the preamble and the midamble. At 2370, multiplexing group randomization is implemented by assigning different multiplexing groups to one or more layers in different OFDM symbols.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   assigning resources for Demodulation Reference signals (DMRS) corresponding to each of two or more data streams, wherein the resources assigned to each of the data streams are staggered in frequency and span two or more Orthogonal Frequency Division Multiplexing (OFDM) symbols, wherein each of the assigned resources is assigned to multiplexed DMRS corresponding to a combination of the two or more data streams, wherein the multiplexed DMRS corresponding to the two or more data streams are multiplexed using time-domain cyclic shifts over each of the two or more OFDM symbols, wherein a different code sequence is used for each of the two or more data streams in each of the two or more OFDM symbols,
   wherein the resources assigned to the multiplexed DMRS corresponding to a same combination of two or more data streams occupy all tones of a resource block such that a different set of tones of the resource block is assigned to each of two different OFDM symbols; and
   transmitting the DMRS using the assigned resources.

2. The method of claim 1, wherein the time-domain cyclic are achieved by phase ramping in frequency domain.

3. The method of claim 1, further comprising assigning the same code sequence to DMRSs corresponding to the two or more data streams.

4. The method of claim 1, wherein the two or more OFDM symbols comprise non-adjacent OFDM symbols.

5. The method of claim 1, further comprising multiplexing DMRSs corresponding to a different combination of data streams in different OFDM symbols.

6. The method of claim 1, wherein the two or more OFDM symbols comprise adjacent OFDM symbols.

7. The method of claim 1, further comprising, for a group of multiplexed DMRSs corresponding to multiplexed data streams, repeating DMRS pattern of a first set of OFDM symbols over a second set of OFDM symbols.

8. An apparatus for wireless communication, comprising:
   means for assigning resources for Demodulation Reference signals (DMRS) corresponding to each of two or more data streams, wherein the resources assigned to each of the data streams are staggered in frequency and span two or more Orthogonal Frequency Division Multiplexing (OFDM) symbols, wherein each of the assigned resources is assigned to multiplexed DMRS corresponding to a combination of the two or more data streams, wherein the multiplexed DMRS corresponding to the two or more data streams are multiplexed using time-domain cyclic shifts over each of the two or more OFDM symbols, wherein a different code sequence is used for each of the two or more data streams in each of the two or more OFDM symbols,
   wherein the resources assigned to the multiplexed DMRS corresponding to a same combination of two or more data streams occupy all tones of a resource block such that a different set of tones of the resource block is assigned to each of two different OFDM symbols; and
   means for transmitting the DMRS using the assigned resources.

9. The apparatus of claim 8, wherein the time-domain cyclic shifts are achieved by phase ramping in frequency domain.

10. The apparatus of claim 8, further comprising means for assigning the same code sequence to DMRSs corresponding to the two or more data streams.

11. An apparatus for wireless communication, comprising:
    at least one processor configured to assign resources for Demodulation Reference signals (DMRS) corresponding to each of two or more data streams, wherein the resources assigned to each of the data streams are staggered in frequency and span two or more Orthogonal Frequency Division Multiplexing (OFDM) symbols, wherein each of the assigned resources is assigned to multiplexed DMRS corresponding to a combination of the two or more data streams, wherein the multiplexed DMRS corresponding to the two or more data streams are multiplexed using time-domain cyclic shifts over each of the two or more OFDM symbols, wherein a different code sequence is used for each of the two or more data streams in each of the two or more OFDM symbols,
    wherein the resources assigned to the multiplexed DMRS corresponding to a same combination of two or more data streams occupy all tones of a resource block such that a different set of tones of the resource block is assigned to each of two different OFDM symbols; and
    a transceiver for transmitting the DMRS using the assigned resources; and
    a memory coupled to the at least one processor.

12. The apparatus of claim 11, wherein the at least one processor is further configured to assign the same code sequence to DMRSs corresponding to the two or more data streams.

13. A non-transitory computer-readable medium for wireless communication, storing instructions which when executed by at least one processor performs a method comprising:
    assigning resources for Demodulation Reference signals (DMRS) corresponding to each of two or more data streams, wherein the resources assigned to each of the data streams are staggered in frequency and span two or more Orthogonal Frequency Division Multiplexing (OFDM) symbols, wherein each of the assigned resources is assigned to multiplexed DMRS corresponding to a combination of the two or more data streams, wherein the multiplexed DMRS corresponding to the two or more data streams are multiplexed using time-domain cyclic shifts over each of the two or more OFDM symbols, wherein a different code sequence is used for each of the two or more data streams in each of the two or more OFDM symbols, wherein the resources assigned to the multiplexed DMRS corresponding to a same combination of two or more data streams occupy all tones of a resource block such that a different set of tones of the resource block is assigned to each of two different OFDM symbols; and transmitting the DMRS using the assigned resources.

14. The computer-readable medium of claim 13, further comprising instructions for assigning the same code sequence to DMRSs corresponding to two or more data streams.

\* \* \* \* \*